US010624125B2

(12) United States Patent
Yerramalli et al.

(10) Patent No.: US 10,624,125 B2
(45) Date of Patent: Apr. 14, 2020

(54) TECHNIQUES FOR SEMI-AUTONOMOUSLY SCHEDULING AN UPLINK TRANSMISSION IN A SHARED RADIO FREQUENCY SPECTRUM BAND

(71) Applicant: QUALCOMM Incorporated, San Diego, CA (US)

(72) Inventors: Srinivas Yerramalli, San Diego, CA (US); Arumugam Chendamarai Kannan, San Diego, CA (US); Chirag Sureshbhai Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/791,145

(22) Filed: Oct. 23, 2017

(65) Prior Publication Data
US 2018/0115347 A1 Apr. 26, 2018

Related U.S. Application Data
(60) Provisional application No. 62/413,276, filed on Oct. 26, 2016.

(51) Int. Cl.
H04W 74/08 (2009.01)
H04W 72/04 (2009.01)
(Continued)

(52) U.S. Cl.
CPC ...... H04W 74/0808 (2013.01); H04B 7/0404 (2013.01); H04W 72/0413 (2013.01);
(Continued)

(58) Field of Classification Search
CPC ............ H04B 7/0404; H04W 72/0413; H04W 74/004; H04W 74/0808
See application file for complete search history.

(56) References Cited

U.S. PATENT DOCUMENTS 9,491,777 B2 * 11/2016 Chen ................. H04W 72/1226
9,509,486 B2 * 11/2016 Yerramalli ................ H04L 5/14
(Continued)

FOREIGN PATENT DOCUMENTS

WO WO-2016164465 A1 10/2016

OTHER PUBLICATIONS

Huawei, et al., "Frame Structure for LAA DL and UL Transmission Operation", 3GPP Draft; R1-152470, 3rd Generation Partnership Project (3GPP), Mobile Competence Centre; 650, Route Des Lucioles; F-06921 Sophia-Antipolis Cedex; France, vol. RAN WG1, No. Fukuoka, Japan; May 25, 2015-May 29, 2015, May 24, 2015 (May 24, 2015), 5 Pages, XP050970908, Retrieved from the Internet: URL: http://www.3gpp.org/ftp/Meetings_3GPP_SYNC/RAN1/Docs/ [retrieved on May 24, 2015].
International Search Report and Written Opinion—PCT/US2017/058062—ISA/EPO—dated Jun. 7, 2018.
(Continued)

Primary Examiner — Magdi Elhag
(74) Attorney, Agent, or Firm — Holland & Hart LLP

(57) ABSTRACT

Techniques are described for wireless communication. One method includes receiving, from a network access device, an uplink grant to transmit over a channel of a shared radio frequency spectrum band. The uplink grant indicates a number of subframes and a transmission window having a duration of a plurality of subframes. The method further includes contending for access to the channel of the shared radio frequency spectrum band based at least in part on a listen before talk (LBT) procedure and in accordance with the uplink grant; and transmitting an uplink transmission over the channel of the shared radio frequency spectrum band, in accordance with the uplink grant/ A starting subframe of the uplink transmission is based at least in part on the LBT procedure and is within the transmission window.

24 Claims, 17 Drawing Sheets

(51) Int. Cl.
*H04B 7/0404* (2017.01)
*H04W 74/00* (2009.01)
*H04W 16/14* (2009.01)

(52) U.S. Cl.
CPC ..... *H04W 74/004* (2013.01); *H04B 2201/698* (2013.01); *H04W 16/14* (2013.01); *H04W 74/006* (2013.01)

(56) References Cited

U.S. PATENT DOCUMENTS

| | | | | |
|---|---|---|---|---|
| 9,717,071 | B2* | 7/2017 | Chen | H04W 72/1215 |
| 10,201,016 | B2* | 2/2019 | Dabeer | H04W 74/0833 |
| 2015/0223075 | A1* | 8/2015 | Bashar | H04W 16/14 370/329 |
| 2016/0057783 | A1* | 2/2016 | Rosa | H04W 74/0833 370/329 |
| 2016/0302225 | A1* | 10/2016 | Damnjanovic | H04W 72/1284 |
| 2016/0309467 | A1* | 10/2016 | Yerramalli | H04W 72/0446 |
| 2016/0345344 | A1* | 11/2016 | Larsson | H04W 72/1289 |
| 2017/0290040 | A1* | 10/2017 | Dinan | H04W 76/27 |
| 2018/0176944 | A1* | 6/2018 | Wang | H04W 74/0808 |
| 2018/0191547 | A1* | 7/2018 | Mukherjee | H04L 27/2692 |
| 2018/0242367 | A1* | 8/2018 | Kim | H04W 72/04 |
| 2018/0288801 | A1* | 10/2018 | Cierny | H04L 5/0048 |
| 2019/0053222 | A1* | 2/2019 | Bhorkar | H04W 16/14 |

OTHER PUBLICATIONS

Mediatek Inc: "eLAA Uplink Channel Access", 3GPP Draft; R1-165120, ELAA Channel Access, 3rd Generation Partnership Project (3GPP), Mobile Competence Centre; 650, Route Des Lucioles; F-06921, Sophia-Antipolis Cedex; France, vol. RAN WG1, Nanjing, China; May 23, 2016-May 27, 2016, May 14, 2016 (May 14, 2016), XP051089841, pp. 1-9, Retrieved from the Internet: URL: http://www.3gpp.org/ftp/tsg_ran/WG1_RL1/TSGR1_85/Docs/.

Partial International Search Report—PCT/US2017/058062—ISA/EPO—dated Feb. 6, 2018.

ETRI: "Discussion on the UL LBT for LAA", 3GPP Draft; R1-153001, Discussion on the UL LBT for LAA, 3rd Generation Partnership Project (3GPP), Mobile Competence Centre; 650, Route Des Lucioles; F-06921, Sophia-Antipolis Cedex; France, vol. RAN WG1, No. Fukuoka, Japan; May 25, 2015-May 29, 2015, May 24, 2015 (May 24, 2015), XP050973612, pp. 1-9, Retrieved from the Internet: URL: http://www.3gpp.org/ftp/Meetings_3GPP_SYNC/RAN1/Docs/.

Fujitsu: "On UL Channel Access Framework for Enhanced LAA", 3GPP Draft; R1-162331, UL Channel Access Mechanism for Enhanced LAA Final, 3rd Generation Partnership Project (3GPP), Mobile Competence Centre; 650, Route Des Lucioles; F-06921 Sophia-Antipolis Cedex, vol. RAN WG1, Busan, Korea; Apr. 11, 2016-Apr. 15, 2016, Apr. 1, 2016,(Apr. 1, 2016), XP051079549, pp. 1-5 URL: http://www.3gpp.org/ftp/tsg_ran/WG1%20_RL%201% 20/TSGR1%20_84b/Docs/.

* cited by examiner

TECHNIQUES FOR SEMI-AUTONOMOUSLY SCHEDULING AN UPLINK TRANSMISSION IN A SHARED RADIO FREQUENCY SPECTRUM BAND

CROSS REFERENCES

The present Application for Patent claims priority to U.S. Provisional Patent Application No. 62/413,276 by Yerramalli et al., entitled "TECHNIQUES FOR SEM-AUTONOMOUSLY SCHEDULING AN UPLINK TRANSMISSION IN A SHARED RADIO FREQUENCY SPECTRUM BAND," filed Oct. 26, 2016, assigned to the assignee hereof.

BACKGROUND

Field of the Disclosure

The present disclosure, for example, relates to wireless communication systems, and more particularly to techniques for semi-autonomously scheduling an uplink transmission in a shared radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of network access devices (e.g., base stations), each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

Some modes of communication may enable communication between a base station and a UE over a shared radio frequency spectrum band, or over different radio frequency spectrum bands (e.g., a dedicated radio frequency spectrum band and a shared radio frequency spectrum band). With increasing data traffic in cellular networks that use a dedicated radio frequency spectrum band, offloading of at least some data traffic to a shared radio frequency spectrum band may provide a mobile network operator (or cellular operator) with opportunities for enhanced data transmission capacity. Use of a shared radio frequency spectrum band may also provide service in areas where access to a dedicated radio frequency spectrum band is unavailable.

SUMMARY

Techniques are described for semi-autonomously scheduling an uplink transmission in a shared radio frequency spectrum band. In some examples, a network access device may transmit an uplink grant to transmit over a channel of a shared radio frequency spectrum band. The uplink grant may indicate a number of subframes and a transmission window having a duration of a plurality of subframes. A UE that receives the uplink grant may contend for access to the channel of the shared radio frequency spectrum band based at least in part on a listen before talk (LBT) procedure and in accordance with the uplink grant. Upon gaining access to the channel based at least in part on the LBT procedure and in accordance with the uplink grant, the UE may transmit an uplink transmission over the channel of the shared radio frequency spectrum band. The starting subframe of the uplink transmission may be based at least in part on the LBT procedure (e.g., based at least in part on when the UE gains access to the channel) and may be within the transmission window. The network access device may monitor for the starting subframe of the uplink transmission, in accordance with the uplink grant, during the transmission window.

In some examples, a network access device may monitor a portion of a subframe of a channel of a shared radio frequency spectrum band for scheduling request (SR) transmissions. The portion of the subframe may be monitored based at least in part on identifying the subframe as being outside a reservation of the channel by the network access device, and based at least in part on an absence of a reference signal transmission by the network access device in the subframe. A UE may also identify the subframe as outside a reservation of the channel by the network access device, and based at least in part on detecting an absence of a reference signal transmission by the network access device in the subframe, the UE may transmit a SR in the subframe.

In one example, a method for wireless communication at a UE is described. The method may include receiving, from a network access device, an uplink grant to transmit over a channel of a shared radio frequency spectrum band. The uplink grant may indicate a number of subframes and a transmission window having a duration of a plurality of subframes. The method may also include contending for access to the channel of the shared radio frequency spectrum band based at least in part on a LBT procedure and in accordance with the uplink grant; and transmitting an uplink transmission over the channel of the shared radio frequency spectrum band, in accordance with the uplink grant. A starting subframe of the uplink transmission may be based at least in part on the LBT procedure and within the transmission window.

In some examples of the method, the transmission window may be outside a reservation of the channel by the network access device. In some examples, the method may include receiving an indication of the LBT procedure to be performed when contending for access to the channel of the shared radio frequency spectrum band. The indication may be received in at least one of: the uplink grant, radio resource control (RRC) signaling, a transmission of system information, a UE-specific transmission, a cell-specific transmission, semi-persistent scheduling (SPS) information, or a combination thereof. In some examples, the method may include receiving at least one parameter of the transmission window from a group consisting of: a first indication of a start of the transmission window, a second indication of an end of the transmission window, a third indication of the duration of the transmission window, or a combination thereof. In some examples, the at least one parameter of the transmission window may be received in at least one of: the uplink grant, RRC signaling, a transmission of system information, a UE-specific transmission, a cell-specific transmission, SPS information, or a combination thereof. In some examples, the first indication, the second indication, or the third indication may be relative to a channel occupancy time of the network access device. In some examples, the uplink grant may be received in SPS information, and the method may include receiving, during a reservation of the channel by the network access device, an indication that the uplink grant is active for the transmission window.

In one example, an apparatus for wireless communication at a UE is described. The apparatus may include means for receiving, from a network access device, an uplink grant to transmit over a channel of a shared radio frequency spectrum band. The uplink grant may indicate a number of subframes and a transmission window having a duration of a plurality of subframes. The apparatus may also include means for contending for access to the channel of the shared radio frequency spectrum band based at least in part on a LBT procedure and in accordance with the uplink grant; and means for transmitting an uplink transmission over the channel of the shared radio frequency spectrum band, in accordance with the uplink grant. A starting subframe of the uplink transmission may be based at least in part on the LBT procedure and within the transmission window.

In some examples of the apparatus, the transmission window may be outside a reservation of the channel by the network access device. In some examples, the apparatus may include means for receiving an indication of the LBT procedure to be performed when contending for access to the channel of the shared radio frequency spectrum band. The indication may be received in at least one of: the uplink grant, RRC signaling, a transmission of system information, a UE-specific transmission, a cell-specific transmission, SPS information, or a combination thereof. In some examples, the apparatus may include means for receiving at least one parameter of the transmission window from a group consisting of: a first indication of a start of the transmission window, a second indication of an end of the transmission window, a third indication of the duration of the transmission window, or a combination thereof. In some examples, the at least one parameter of the transmission window may be received in at least one of: the uplink grant, RRC signaling, a transmission of system information, a UE-specific transmission, a cell-specific transmission, SPS information, or a combination thereof. In some examples, the first indication, the second indication, or the third indication may be relative to a channel occupancy time of the network access device. In some examples, the uplink grant may be received in SPS information, and the apparatus may include means for receiving, during a reservation of the channel by the network access device, an indication that the uplink grant is active for the transmission window.

In one example, an apparatus for wireless communication at a UE is described. The apparatus may include a processor and memory coupled to the processor. The processor may be configured to receive, from a network access device, an uplink grant to transmit over a channel of a shared radio frequency spectrum band. The uplink grant may indicate a number of subframes and a transmission window having a duration of a plurality of subframes. The processor may also be configured to contend for access to the channel of the shared radio frequency spectrum band based at least in part on a LBT procedure and in accordance with the uplink grant; and to transmit an uplink transmission over the channel of the shared radio frequency spectrum band, in accordance with the uplink grant. A starting subframe of the uplink transmission may be based at least in part on the LBT procedure and within the transmission window.

In some examples of the apparatus, the transmission window may be outside a reservation of the channel by the network access device. In some examples, the processor may be configured to receive at least one parameter of the transmission window from a group consisting of: a first indication of a start of the transmission window, a second indication of an end of the transmission window, a third indication of the duration of the transmission window, or a combination thereof. In some examples, the first indication, the second indication, or the third indication may be relative to a channel occupancy time of the network access device. In some examples, the uplink grant may be received in SPS information, and the processor may be configured to receive, during a reservation of the channel by the network access device, an indication that the uplink grant is active for the transmission window.

In one example, a computer-readable medium for storing instructions executable by a processor is described. The instructions may include instructions to receive, from a network access device, an uplink grant to transmit over a channel of a shared radio frequency spectrum band. The uplink grant may indicate a number of subframes and a transmission window having a duration of a plurality of subframes. The instructions may also include instructions to contend for access to the channel of the shared radio frequency spectrum band based at least in part on a LBT procedure and in accordance with the uplink grant; and instructions to transmit an uplink transmission over the channel of the shared radio frequency spectrum band, in accordance with the uplink grant. A starting subframe of the uplink transmission may be based at least in part on the LBT procedure and within the transmission window.

In one example, a method for wireless communication at a network access device is described. The method may include transmitting an uplink grant to transmit over a channel of a shared radio frequency spectrum band. The uplink grant may indicate a number of subframes and a transmission window having a duration of a plurality of subframes. The method may also include monitoring for a starting subframe of an uplink transmission, in accordance with the uplink grant, during the transmission window.

In some examples of the method, the transmission window may be outside a reservation of the channel by the network access device. In some examples, the method may include transmitting an indication of a LBT procedure to be performed by a UE when contending for access to the channel of the shared radio frequency spectrum band. The indication may be transmitted in at least one of: the uplink grant, RRC signaling, a transmission of system information, a UE-specific transmission, a cell-specific transmission, SPS information, or a combination thereof. In some examples, the method may include transmitting at least one parameter of the transmission window from a group consisting of: a first indication of a start of the transmission window, a second indication of an end of the transmission window, a third indication of the duration of the transmission window, or a combination thereof. In some examples, the at least one parameter of the transmission window may be transmitted in at least one of: the uplink grant, RRC signaling, a transmission of system information, a UE-specific transmission, a cell-specific transmission, SPS information, or a combination thereof. In some examples, the first indication, the second indication, or the third indication may be relative to a channel occupancy time of the network access device. In some examples, the uplink grant may be transmitted in SPS information, and the method may include transmitting, during a reservation of the channel by the network access device, an indication that the uplink grant is active for the transmission window. In some examples, the method may include receiving the uplink transmission over the channel of the shared radio frequency spectrum band, in accordance with the uplink grant.

In one example, an apparatus for wireless communication at a network access device is described. The apparatus may include means for transmitting an uplink grant to transmit over a channel of a shared radio frequency spectrum band. The uplink grant may indicate a number of subframes and a transmission window having a duration of a plurality of subframes. The apparatus may also include means for monitoring for a starting subframe of an uplink transmission, in accordance with the uplink grant, during the transmission window.

In some examples of the apparatus, the transmission window may be outside a reservation of the channel by the network access device. In some examples, the apparatus may include means for transmitting an indication of a LBT procedure to be performed by a UE when contending for access to the channel of the shared radio frequency spectrum band. The indication may be transmitted in at least one of: the uplink grant, RRC signaling, a transmission of system information, a UE-specific transmission, a cell-specific transmission, SPS information, or a combination thereof. In some examples, the apparatus may include means for transmitting at least one parameter of the transmission window from a group consisting of: a first indication of a start of the transmission window, a second indication of an end of the transmission window, a third indication of the duration of the transmission window, or a combination thereof. In some examples, the at least one parameter of the transmission window may be transmitted in at least one of: the uplink grant, RRC signaling, a transmission of system information, a UE-specific transmission, a cell-specific transmission, SPS information, or a combination thereof. In some examples, the first indication, the second indication, or the third indication may be relative to a channel occupancy time of the network access device. In some examples, the uplink grant may be transmitted in SPS information, and the apparatus may include means for transmitting, during a reservation of the channel by the network access device, an indication that the uplink grant is active for the transmission window. In some examples, the apparatus may include means for receiving the uplink transmission over the channel of the shared radio frequency spectrum band, in accordance with the uplink grant.

In one example, an apparatus for wireless communication at a network access device is described. The apparatus may include a processor and memory coupled to the processor. The processor may be configured to transmit an uplink grant to transmit over a channel of a shared radio frequency spectrum band. The uplink grant may indicate a number of subframes and a transmission window having a duration of a plurality of subframes. The processor may also be configured to monitor for a starting subframe of an uplink transmission, in accordance with the uplink grant, during the transmission window.

In some examples of the apparatus, the transmission window may be outside a reservation of the channel by the network access device. In some examples, the processor may be configured to transmit at least one parameter of the transmission window from a group consisting of: a first indication of a start of the transmission window, a second indication of an end of the transmission window, a third indication of the duration of the transmission window, or a combination thereof. In some examples, the first indication, the second indication, or the third indication may be relative to a channel occupancy time of the network access device.

In some examples, the uplink grant may be transmitted in SPS information, and the processor may be configured to transmit, during a reservation of the channel by the network access device, an indication that the uplink grant is active for the transmission window.

In one example, a computer-readable medium for storing instructions executable by a processor is described. The instructions may include instructions to transmit an uplink grant to transmit over a channel of a shared radio frequency spectrum band. The uplink grant may indicate a number of subframes and a transmission window having a duration of a plurality of subframes. The instructions may also include instructions to monitor for a starting subframe of an uplink transmission, in accordance with the uplink grant, during the transmission window.

In one example, a method for wireless communication at a UE is described. The method may include identifying a subframe, of a channel of a shared radio frequency spectrum band, that is outside a reservation of the channel by a network access device; detecting an absence of a reference signal transmission by the network access device in the subframe; and transmitting in the subframe, based at least in part on the detected absence of the reference signal transmission, a SR.

In some examples of the method, the reference signal transmission may include a cell-specific reference signal (CRS) transmission. In some examples, the SR may be transmitted in a subset of symbol periods of the subframe. The subset of symbol periods may start after a first symbol period of the subframe. In some examples, the method may include contending for access to the channel of the shared radio frequency spectrum band, prior to transmitting the SR in the subframe, based at least in part on a LBT procedure; and the SR may be transmitted based at least in part on the LBT procedure. In some examples, the method may include receiving an uplink grant based at least in part on the SR.

In one example, an apparatus for wireless communication at a UE is described. The apparatus may include means for identifying a subframe, of a channel of a shared radio frequency spectrum band, that is outside a reservation of the channel by a network access device; means for detecting an absence of a reference signal transmission by the network access device in the subframe; and means for transmitting in the subframe, based at least in part on the detected absence of the reference signal transmission, a SR.

In some examples of the apparatus, the reference signal transmission may include a CRS transmission. In some examples, the SR may be transmitted in a subset of symbol periods of the subframe. The subset of symbol periods may start after a first symbol period of the subframe. In some examples, the apparatus may include means for contending for access to the channel of the shared radio frequency spectrum band, prior to transmitting the SR in the subframe, based at least in part on a LBT procedure, and the SR may be transmitted based at least in part on the LBT procedure. In some examples, the apparatus may include means for receiving an uplink grant based at least in part on the SR.

In one example, an apparatus for wireless communication at a UE is described. The apparatus may include a processor and memory coupled to the processor. The processor may be configured to identify a subframe, of a channel of a shared radio frequency spectrum band, that is outside a reservation of the channel by a network access device; to detect an absence of a reference signal transmission by the network access device in the subframe; and to transmit in the subframe, based at least in part on the detected absence of the reference signal transmission, a SR.

In some examples of the apparatus, the reference signal transmission may include a CRS transmission. In some examples, the SR may be transmitted in a subset of symbol periods of the subframe. The subset of symbol periods may start after a first symbol period of the subframe. In some examples, the processor may be configured to contend for access to the channel of the shared radio frequency spectrum band, prior to transmitting the SR in the subframe, based at least in part on a LBT procedure; and the SR may be transmitted based at least in part on the LBT procedure.

In one example, a computer-readable medium for storing instructions executable by a processor is described. The instructions may include instructions to identify a subframe, of a channel of a shared radio frequency spectrum band, that is outside a reservation of the channel by a network access device; instructions to detect an absence of a reference signal transmission by the network access device in the subframe; and instructions to transmit in the subframe, based at least in part on the detected absence of the reference signal transmission, a SR.

In one example, a method for wireless communication at a network access device is described. The method may include identifying a subframe of a channel of a shared radio frequency spectrum band based at least in part on the subframe being outside a reservation of the channel by the network access device, and based at least in part on an absence of a reference signal transmission by the network access device in the subframe; and monitoring a portion of the subframe for SR transmissions.

In some examples of the method, the reference signal transmission may include a CRS transmission. In some examples, the monitored portion of the subframe may include a subset of symbol periods of the subframe. The subset of symbol periods may start after a first symbol period of the subframe. In some examples, the method may include receiving a SR transmission from a UE, and transmitting an uplink grant to the UE based at least in part on the SR transmission. In some examples, the method may include detecting an absence of the SR transmissions during the monitored portion of the subframe; and contending for access to the channel of the shared radio frequency spectrum band or transmitting over the channel of the shared radio frequency spectrum band, during a next subframe following the subframe that includes the monitored portion, based at least in part on the detected absence of the SR transmissions during the monitored portion.

In one example, an apparatus for wireless communication at a network access device is described. The apparatus may include means for identifying a subframe of a channel of a shared radio frequency spectrum band based at least in part on the subframe being outside a reservation of the channel by the network access device, and based at least in part on an absence of a reference signal transmission by the network access device in the subframe; and means for monitoring a portion of the subframe for SR transmissions.

In some examples of the apparatus, the reference signal transmission may include a CRS transmission. In some examples, the monitored portion of the subframe may include a subset of symbol periods of the subframe. The subset of symbol periods may start after a first symbol period of the subframe. In some examples, the apparatus may include means for receiving a SR transmission from a UE, and means for transmitting an uplink grant to the UE based at least in part on the SR transmission. In some examples, the apparatus may include means for detecting an absence of the SR transmissions during the monitored portion of the subframe; and means for contending for access to the channel of the shared radio frequency spectrum band or transmitting over the channel of the shared radio frequency spectrum band, during a next subframe following the subframe that includes the monitored portion, based at least in part on the detected absence of the SR transmissions during the monitored portion.

In one example, an apparatus for wireless communication at a network access device is described. The apparatus may include a processor and memory coupled to the processor. The processor may be configured to identify a subframe of a channel of a shared radio frequency spectrum band based at least in part on the subframe being outside a reservation of the channel by the network access device, and based at least in part on an absence of a reference signal transmission by the network access device in the subframe; and to monitor a portion of the subframe for SR transmissions.

In some examples of the apparatus, the reference signal transmission may include a CRS transmission. In some examples, the monitored portion of the subframe may include a subset of symbol periods of the subframe. The subset of symbol periods may start after a first symbol period of the subframe. In some examples, the processor may be configured to receive a SR transmission from a UE, and to transmit an uplink grant to the UE based at least in part on the SR transmission.

In one example, a computer-readable medium for storing instructions executable by a processor is described. The instructions may include instructions to identify a subframe of a channel of a shared radio frequency spectrum band based at least in part on the subframe being outside a reservation of the channel by the network access device, and based at least in part on an absence of a reference signal transmission by the network access device in the subframe; and instructions to monitor a portion of the subframe for SR transmissions.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
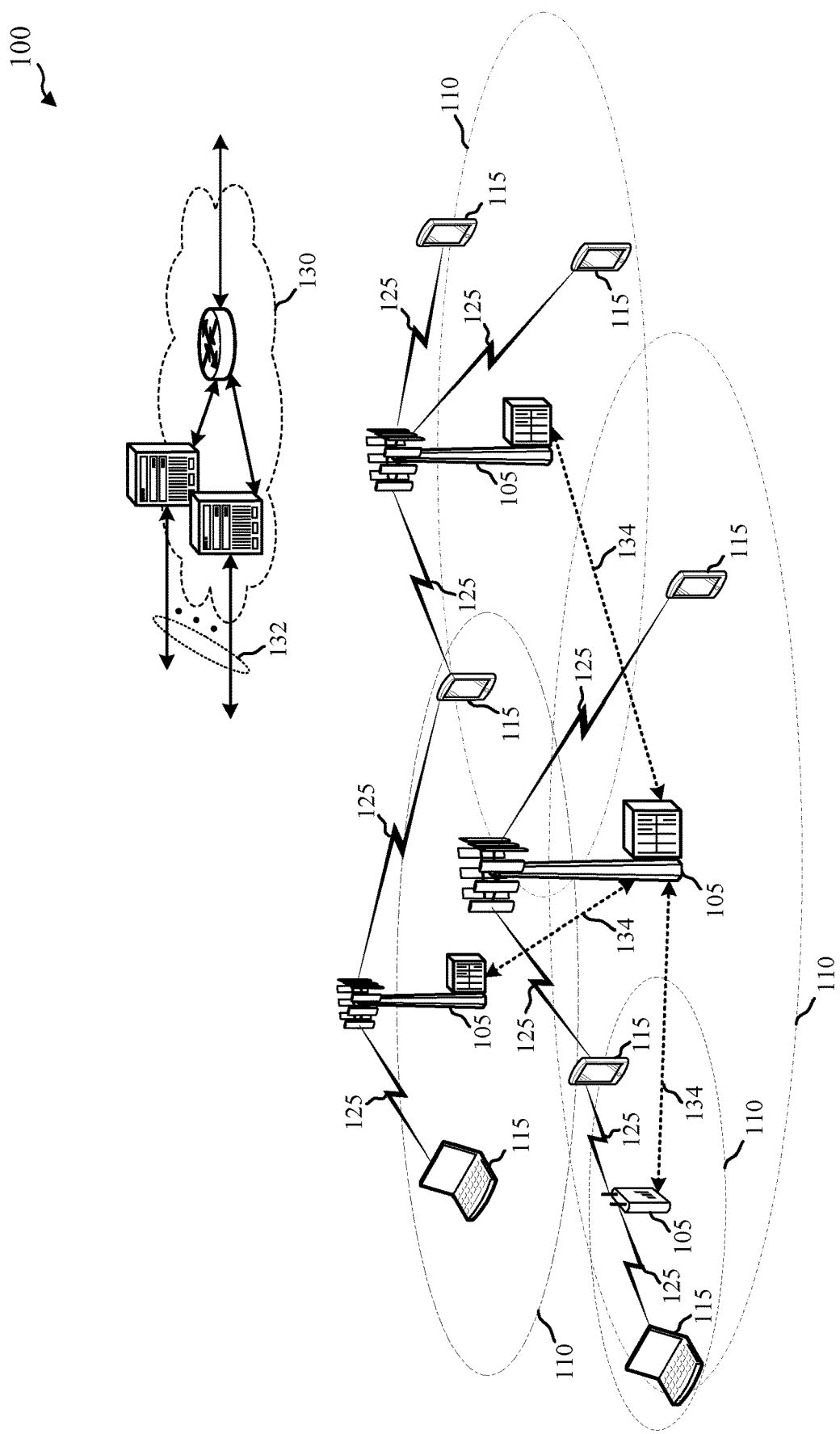
FIG. 1 illustrates an example of a wireless communication system, in accordance with various aspects of the present disclosure.

Techniques are described in which a shared radio frequency spectrum band is used for at least a portion of communications in a wireless communication system. In some examples, the shared radio frequency spectrum band may be used for Long Term Evolution (LTE) or LTE-Advanced (LTE-A) communications, Licensed Assisted Access (LAA) communications, Further enhanced LAA (FeLAA) communications, or MuLTEfire (MF) network communications. The shared radio frequency spectrum band may be used in combination with, or independent from, a dedicated radio frequency spectrum band. The dedicated radio frequency spectrum band may include a radio frequency spectrum band licensed to particular users for particular uses. The shared radio frequency spectrum band may include a radio frequency spectrum band available for Wi-Fi use, a radio frequency spectrum band available for use by different radio access technologies, or a radio frequency spectrum band available for use by multiple mobile network operators (MNOs) in an equally shared or prioritized manner.

With increasing data traffic in cellular networks that use a dedicated radio frequency spectrum band, offloading of at least some data traffic to a shared radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. Use of a shared radio frequency spectrum band may also provide service in areas where access to a dedicated radio frequency spectrum band is unavailable. Before communicating over a shared radio frequency spectrum band, a transmitting apparatus may perform a LBT procedure to contend for access to the shared radio frequency spectrum band. Such a LBT procedure may include performing a clear channel assessment (CCA) procedure (or extended CCA procedure) to determine whether a channel of the shared radio frequency spectrum band is available. In some examples, a LBT procedure may be relatively long (e.g., a Category (CAT) 4 LBT procedure), while in other examples, a LBT procedure may be relatively short (e.g., a 25 millisecond (ms) LBT procedure).

Under some conditions, the uplink throughput between a UE and a network access device of a wireless wide area network (WWAN), which UE and network access device communicate over a shared radio frequency spectrum band may be less than the uplink throughput between a station and an access point of a wireless local area network (WLAN), which station and access point communicate over the shared radio frequency spectrum band. For example, the uplink throughput between a UE and a network access device in a FeLAA network or MF network may be less than the uplink throughput between a station and access point in a Wi-Fi network. This can be attributed to various factors, such as: a UE being limited to transmissions at fixed instances of time, when scheduled; nodes (e.g., hidden nodes) that are outside the coverage area of a network access device but near a UE, which nodes do not receive channel reservation signals of the network access device and then transmit at times that interfere with the UE gaining access to the shared radio frequency spectrum band; or nodes (e.g., hidden nodes) that are outside the coverage area of a UE but near a network access device, which nodes do not receive channel reservation signals of the UE and then transmit at times that interfere with a network access device receiving transmissions of the UE. Techniques that allow a UE to semi-autonomously schedule an uplink transmission in a shared radio frequency spectrum band may increase the uplink throughput between the UE and a network access device.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100, in accordance with various aspects of the present disclosure. The wireless communication system 100 may include base stations 105 (i.e., a type of network access device), UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a network access device, a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies and/or different types of network access devices.

In some examples, the wireless communication system 100 may include an LTE/LTE-A network. In LTE/LTE-A networks, the term evolved Node B (eNB) may be used to describe sets of one or more base stations 105. In some examples, the wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

In some examples of the wireless communication system 100, some or all of the base stations 105 may be replaced by one or more other type of network access device. For example, when the wireless communication system 100 includes a 5G or new radio network, the base stations 105 may be replaced by sets of radio heads (e.g., smart radio heads) in communication with access node controllers (ANCs), with the ANCs communicating with other ANCs and/or the core network 130.

The wireless communication system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations or other types of network access devices or network equipment, including macro eNBs, small cell eNBs, relay base stations, and the like.

The communication links 125 shown in wireless communication system 100 may include downlinks (DLs), from a base station 105 to a UE 115, and uplinks (ULs), from a UE 115 to a base station 105. The downlinks may also be called forward links, while the uplinks may also be called reverse links.

In some examples, each communication link 125 may include one or more carriers, where each carrier may be a signal made up of multiple sub-carriers (e.g., waveform signals of different frequencies) modulated according to the various radio technologies described above. Each modulated signal may be transmitted on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. Carrier aggregation may be used with both FDD and TDD component carriers.

In an LTE/LTE-A network, a UE 115 may be configured to communicate using up to five CCs when operating in a carrier aggregation mode or dual-connectivity mode. One or more of the CCs may be configured as a DL CC, and one or more of the CCs may be configured as a UL CC. Also, one of the CCs allocated to a UE 115 may be configured as a primary CC (PCC), and the remaining CCs allocated to the UE 115 may be configured as secondary CCs (SCCs).

In some examples, the wireless communication system 100 may support operation over a dedicated radio frequency spectrum band (e.g., a radio frequency spectrum band licensed to particular users for particular uses) or a shared radio frequency spectrum band (e.g., a radio frequency spectrum band that is available for Wi-Fi use, a radio frequency spectrum band that is available for use by different radio access technologies, or a radio frequency spectrum band that is available for use by multiple MNOs in an equally shared or prioritized manner). When communicating over a channel of a shared radio frequency spectrum band, a UE 115 may need to contend for access to the channel using a LBT procedure. In some examples, the UE's probability of accessing the channel may be increased by using semi-autonomous scheduling to schedule an uplink transmission.

In one semi-autonomous scheduling example, a base station 105 may transmit an uplink grant to transmit over a channel of a shared radio frequency spectrum band. The uplink grant may indicate a number of subframes and a transmission window having a duration of a plurality of subframes. A UE 115 that receives the uplink grant may contend for access to the channel of the shared radio frequency spectrum band based at least in part on a LBT procedure and in accordance with the uplink grant. Upon gaining access to the channel based at least in part on the LBT procedure and in accordance with the uplink grant, the UE 115 may transmit an uplink transmission over the channel of the shared radio frequency spectrum band. The starting subframe of the uplink transmission may be based at least in part on the LBT procedure (e.g., based at least in part on when the UE 115 gains access to the channel) and may be within the transmission window. The base station 105 may monitor for the starting subframe of the uplink transmission, in accordance with the uplink grant, during the transmission window.

In another semi-autonomous scheduling example, a base station 105 may monitor a portion of a subframe of a channel of a shared radio frequency spectrum band for SR transmissions. The portion of the subframe may be monitored based at least in part on identifying the subframe as being outside a reservation of the channel by the base station 105, and based at least in part on an absence of a reference signal transmission by the base station 105 in the subframe. A UE 115 may also identify the subframe as outside a reservation of the channel by the base station 105, and based at least in part on detecting an absence of a reference signal transmission by the base station 105 in the subframe, the UE 115 may transmit a SR in the subframe.

Figure 2:
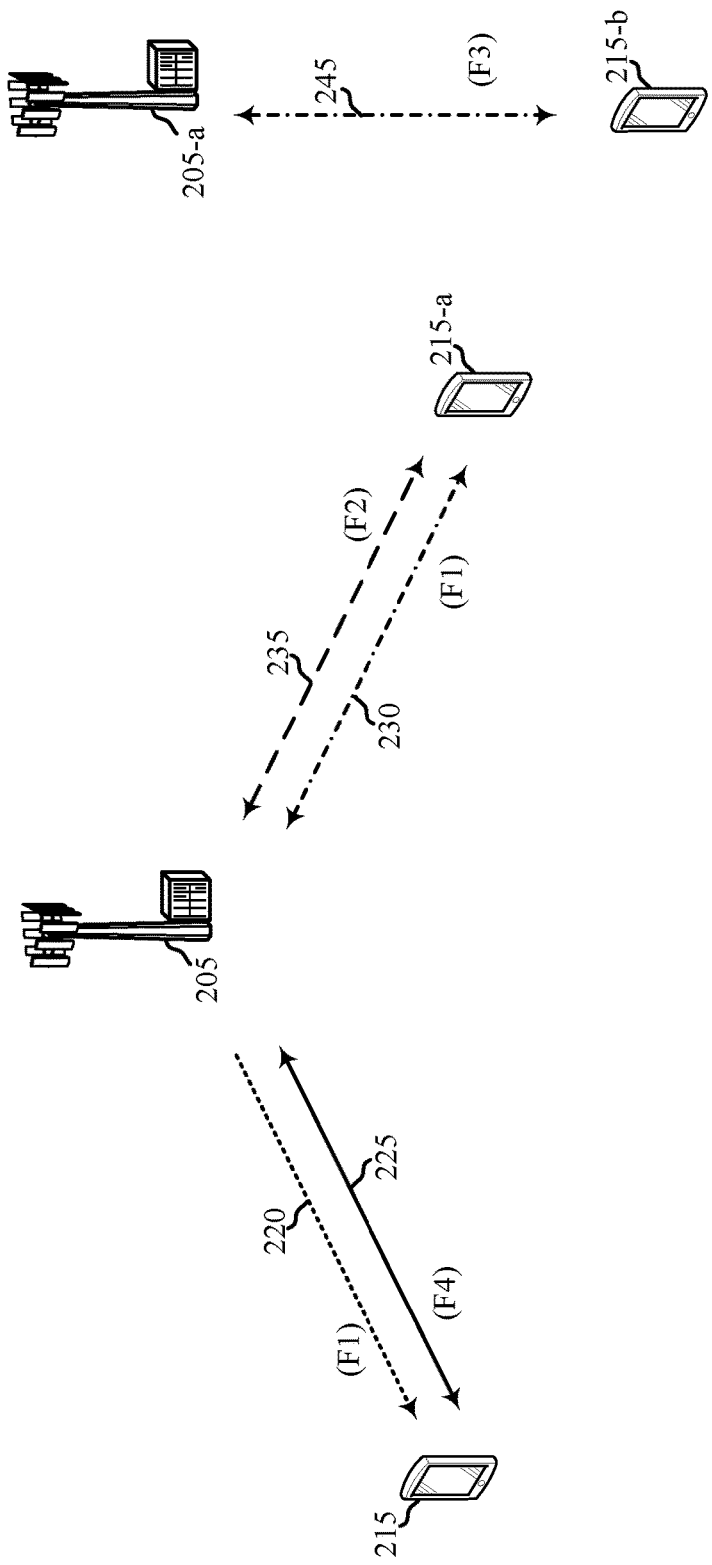
FIG. 2 shows a wireless communication system in which a wireless communication technology may be deployed under different scenarios using a shared radio frequency spectrum band, in accordance with various aspects of the present disclosure.

FIG. 2 shows a wireless communication system 200 in which a wireless communication technology may be deployed under different scenarios using a shared radio frequency spectrum band, in accordance with various aspects of the present disclosure. More specifically, FIG. 2 illustrates examples of a supplemental downlink mode (also referred to as a licensed assisted access (LAA) mode), a carrier aggregation mode (also referred to as an enhanced LAA (eLAA) mode), and a standalone mode, in which LTE/LTE-A is deployed using a shared radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, and a third UE 215-b may be examples of aspects of one or more of the UEs 115 described with reference to FIG. 1.

In the example of the supplemental downlink mode (e.g., the LAA mode) in the wireless communication system 200, the first base station 205 may transmit OFDMA waveforms to the first UE 215 using a downlink channel 220. The downlink channel 220 may be associated with a frequency F1 in a shared radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a dedicated radio frequency spectrum band. The downlink channel 220 in the shared radio frequency spectrum band and the first bidirectional link 225 in the dedicated radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a MNO) that uses a dedicated radio frequency spectrum band and needs to relieve some of the traffic or signaling congestion.

In the example of the carrier aggregation mode (e.g., the eLAA mode) in the wireless communication system 200, the first base station 205 may transmit OFDMA waveforms to the second UE 215-*a* using a second bidirectional link 230 and may receive OFDMA waveforms, SC-FDMA waveforms, or resource block interleaved FDMA waveforms from the second UE 215-*a* using the second bidirectional link 230. The second bidirectional link 230 may be associated with the frequency F1 in the shared radio frequency spectrum band. The first base station 205 may also transmit OFDMA waveforms to the second UE 215-*a* using a third bidirectional link 235 and may receive SC-FDMA waveforms from the second UE 215-*a* using the third bidirectional link 235. The third bidirectional link 235 may be associated with a frequency F2 in a dedicated radio frequency spectrum band. The third bidirectional link 235 may provide a downlink and uplink capacity offload for the first base station 205. Like the supplemental downlink mode (e.g., the LAA mode) described above, this scenario may occur with any service provider (e.g., MNO) that uses a dedicated radio frequency spectrum band and needs to relieve some of the traffic or signaling congestion.

As described above, one type of service provider that may benefit from the capacity offload offered by using LTE/LTE-A in a shared radio frequency spectrum band is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the dedicated radio frequency spectrum band and at least one secondary component carrier (SCC) on the shared radio frequency spectrum band.

In the carrier aggregation mode, data and control may, for example, be communicated in the dedicated radio frequency spectrum band (e.g., via the third bidirectional link 235) while data may, for example, be communicated in the shared radio frequency spectrum band (e.g., via second bidirectional link 230). The carrier aggregation mechanisms supported when using a shared radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-*a* may transmit OFDMA waveforms to the third UE 215-*b* using a bidirectional link 245 and may receive OFDMA waveforms, SC-FDMA waveforms, or resource block interleaved FDMA waveforms from the third UE 215-*b* using the bidirectional link 245. The bidirectional link 245 may be associated with the frequency F3 in the shared radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a dedicated radio frequency spectrum band.

In some examples, a transmitting apparatus such as one of the base stations 105, 205, or 205-*a* described with reference to FIG. 1 or 2, or one of the UEs 115, 215, 215-*a*, or 215-*b* described with reference to FIG. 1 or 2, may use a gating interval to gain access to a wireless channel of a shared radio frequency spectrum band (e.g., to a physical channel of the shared radio frequency spectrum band). In some examples, the gating interval may be synchronous and periodic. For example, the periodic gating interval may be synchronized with at least one boundary of an LTE/LTE-A radio interval. In other examples, the gating interval may be asynchronous. The gating interval may define the application of a sharing protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure or an extended CCA (ECCA) procedure. The outcome of the CCA procedure or ECCA procedure may indicate to the transmitting apparatus whether a wireless channel of a shared radio frequency spectrum band is available or in use for the gating interval (e.g., an LBT radio frame or transmission burst). When a CCA procedure or ECCA procedure indicates the wireless channel is available for a corresponding LBT radio frame or transmission burst (e.g., "clear" for use), the transmitting apparatus may reserve or use the wireless channel of the shared radio frequency spectrum band during part or all of the LBT radio frame. When a CCA procedure or ECCA procedure indicates the wireless channel is not available (e.g., that the wireless channel is in use or reserved by another transmitting apparatus), the transmitting apparatus may be prevented from using the wireless channel during the LBT radio frame. In some examples, a transmitting apparatus may need to perform a CCA procedure or ECCA procedure for some but not other wireless channels in a shared radio frequency spectrum band.

Figure 3:
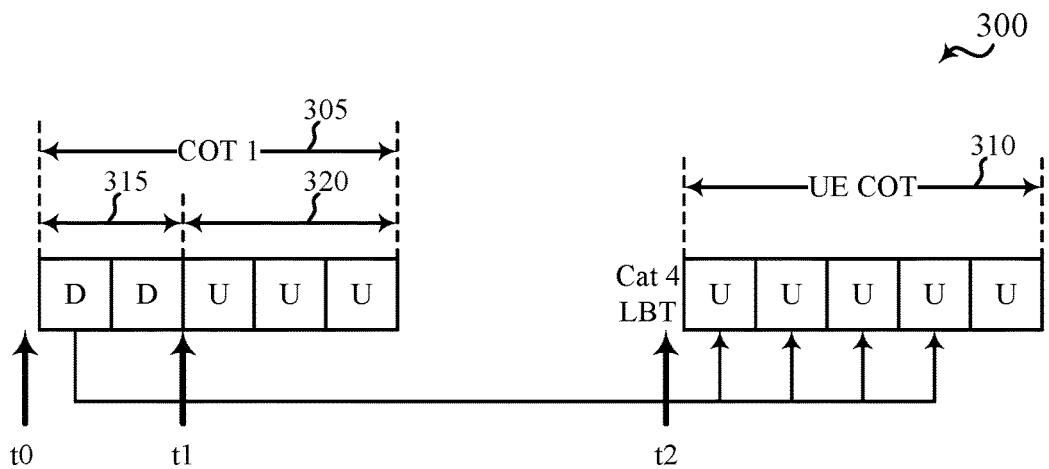
FIG. 3 shows a timeline of communications over a channel of a shared radio frequency spectrum band, in accordance with various aspects of the present disclosure.

FIG. 3 shows a timeline 300 of communications over a channel of a shared radio frequency spectrum band, in accordance with various aspects of the present disclosure. The communications may occur between a network access device (e.g., a network access device including aspects of one or more of the base stations 105 described with reference to FIG. 1 or 2) and a UE (e.g., a UE including aspects of one or more of the UEs 115 described with reference to FIG. 1 or 2). The communications over the channel may include transmissions while the channel is reserved by the network access device (e.g., transmissions during a first channel occupancy time (COT) (COT 1 305)) and transmissions while the channel is reserved by the UE (e.g., transmissions during a second COT (a UE COT 310)).

In some examples, the network access device may contend for access to the channel of the shared radio frequency spectrum band based at least in part on a LBT procedure. At a time t0, just prior to the COT 1 305, the network access device may gain access to the channel of the shared radio frequency spectrum band based at least in part on the LBT procedure. During the COT 1 305, the network access device may transmit over the channel during a downlink period 315 including a number of downlink (D) subframes, and may optionally receive over the channel during an uplink period 320 including a number of uplink (U) subframes. The network access device may transmit one or more uplink grants to a UE during the downlink period 315. The uplink grants may include an optional first number of uplink grants for transmitting during the uplink period 320 of the COT 1 305, and an optional second number of uplink grants for transmitting outside the COT 1 305, during the UE COT 310. Each of the second number of uplink grants may be associated with an uplink transmission beginning at a fixed time (e.g., in a particular subframe).

A UE that receives an uplink grant to transmit during the uplink period 320 of the COT 1 305 may need to contend for access to the channel of the shared radio frequency spectrum band, prior to transmitting in accordance with the uplink grant, based at least in part on a LBT procedure (e.g., a 25 ms LBT procedure). The LBT procedure performed prior to transmitting during the uplink period 320 of the COT 1 305 may be performed (e.g., at time t1) to ensure that a node that is outside the energy detection range of the network access device (i.e., a hidden node) is not already using the channel of the shared radio frequency spectrum band within the energy detection range of the UE.

A UE that receives an uplink grant to transmit during the UE COT 310 may need to contend for access to the channel of the shared radio frequency spectrum band, prior to transmitting in accordance with the uplink grant, based at least in part on a LBT procedure (e.g., a CAT 4 LBT procedure) performed at time t2. The LBT procedure performed prior to transmitting during the UE COT 310 may be performed as a primary means to determine that the channel of the shared radio frequency spectrum band is clear, and to reserve the channel for the UE COT 310. The LBT procedure performed prior to transmitting during the UE COT 310 may have a longer duration and/or greater energy detection sensitivity than the LBT procedure performed prior to transmitting during the uplink period 320 of the COT 1 305, and thus, it may be more difficult for a UE to gain access to the channel of the shared radio frequency spectrum band to transmit during the UE COT 310. Furthermore, the fixed timing of an uplink grant to transmit during the UE COT 310 increases the probability that the uplink grant may not be used because a UE does not gain access to the channel of the shared radio frequency spectrum band in time to transmit in accordance with the uplink grant.

To increase the probability that a UE can transmit outside a reservation of a channel by a network access device (e.g., outside the COT 1 305), the network access device may transmit, to the UE, an uplink grant indicating a number of subframes and a transmission window having a duration of a plurality of subframes. The UE may then contend for access to the channel based at least in part on a LBT procedure and in accordance with the uplink grant. When the UE does not gain access to the channel until after one or more subframes of the transmission window have passed, the UE may transmit a starting subframe of an uplink transmission during a later subframe of the transmission window.

Figure 4:
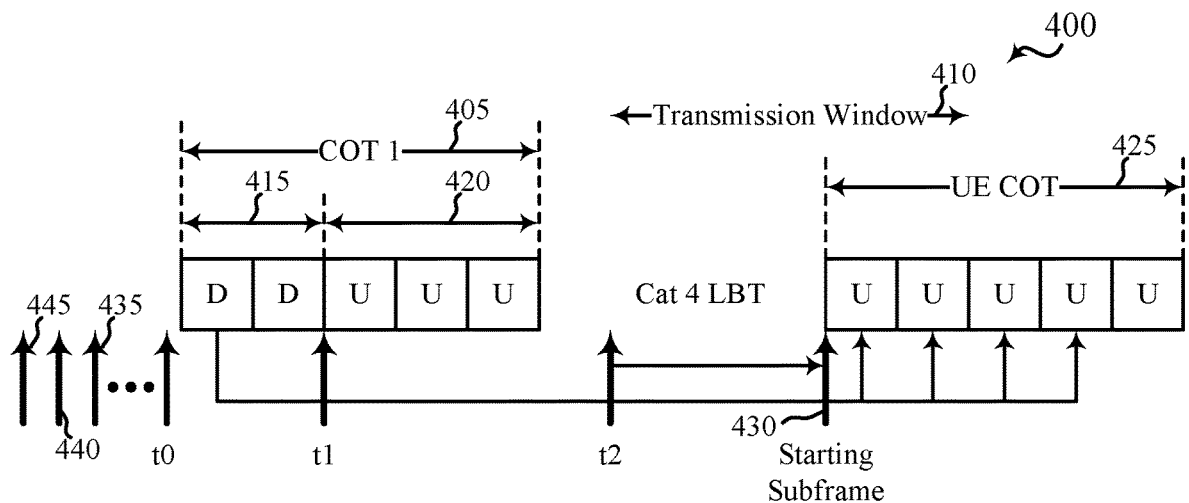
FIG. 4 shows a timeline of communications over a channel of a shared radio frequency spectrum band, in accordance with various aspects of the present disclosure.

FIG. 4 shows a timeline of communications over a channel of a shared radio frequency spectrum band, in accordance with various aspects of the present disclosure. The communications may occur between a network access device (e.g., a network access device including aspects of one or more of the base stations 105 described with reference to FIG. 1 or 2) and a UE (e.g., a UE including aspects of one or more of the UEs 115 described with reference to FIG. 1 or 2). The communications over the channel may include transmissions while the channel is reserved by the network access device (e.g., transmissions during a first channel occupancy time (COT 1 405)) and transmissions while the channel is reserved by the UE (e.g., transmissions beginning during a transmission window 410 outside the COT 1 405).

In some examples, the network access device may contend for access to the channel of the shared radio frequency spectrum band based at least in part on a LBT procedure. At a time t0, just prior to the COT 1 405, the network access device may gain access to the channel of the shared radio frequency spectrum band based at least in part on the LBT procedure. During the COT 1 405, the network access device may transmit over the channel during a downlink period 415 including a number of downlink (D) subframes, and may optionally receive over the channel during an uplink period 420 including a number of uplink (U) subframes. The network access device may transmit one or more uplink grants to a UE during the downlink period 415. The uplink grants may include an optional first number of uplink grants for transmitting during the uplink period 420 of the COT 1 405, and an optional second number of uplink grants for transmitting outside the COT 1 405, beginning in the transmission window 410. Each of the second number of uplink grants may indicate a number of subframes and a transmission window 410 having a duration of a plurality of subframes.

A UE that receives an uplink grant to transmit during the uplink period 420 of the COT 1 405 may need to contend for access to the channel of the shared radio frequency spectrum band, prior to transmitting in accordance with the uplink grant, based at least in part on a LBT procedure (e.g., a 25 ms LBT procedure). The LBT procedure performed prior to transmitting during the uplink period 420 of the COT 1 405 may be performed (e.g., at t1) to ensure that a node that is outside the energy detection range of the network access device (i.e., a hidden node) is not already using the channel of the shared radio frequency spectrum band within the energy detection range of the UE.

A UE that receives an uplink grant to transmit outside the COT 1 405 may need to contend for access to the channel of the shared radio frequency spectrum band, prior to transmitting in accordance with the uplink grant, based at least in part on a LBT procedure (e.g., a CAT 4 LBT procedure) performed at time t2. The LBT procedure performed prior to transmitting outside the COT 1 405 may be performed as a primary means to determine that the channel of the shared radio frequency spectrum band is clear, and to reserve the channel for a UE COT 425. The LBT procedure performed prior to transmitting outside the COT 1 405 may have a longer duration and/or greater energy detection sensitivity than the LBT procedure performed prior to transmitting during the uplink period 420 of the COT 1 405, and thus, it may be more difficult for a UE to gain access to the channel of the shared radio frequency spectrum band to transmit outside the COT 1 405. However, the uplink grant's indication of (e.g., allowance of) a number of subframes and a transmission window 410 having a duration of a plurality of subframes increases the probability that the uplink grant will be used.

As previously mentioned, an uplink grant to transmit on the channel of the shared radio frequency spectrum band outside the COT 1 405 may indicate a number of subframes, which number of subframes may be any subframes within a transmission window 410 having a duration of a plurality of subframes (e.g., where the plurality of subframes includes more subframes than the number of subframes). At the time the network access device transmits the uplink grant to the UE, the identity of the starting subframe 430 of an uplink transmission that may be transmitted in accordance with the uplink grant is unknown, and the indication of the transmission window allows the UE to dynamically determine a starting subframe 430 for an uplink transmission transmitted in accordance with the uplink grant. For example, a UE may begin contending for access to the channel of the shared radio frequency spectrum band at time t2, prior to or at the beginning of the transmission window 410, based at least in part on a LBT procedure. In some examples, the UE may gain access to the channel, based at least in part on the LBT procedure, just prior to or during a first subframe of the transmission window 410, in which case the UE may dynamically identify the first subframe of the transmission window 410 as a starting subframe of an uplink transmission transmitted in accordance with the uplink grant (not shown). In other examples, the UE may not gain access to the channel until a later subframe of the transmission window 410 (e.g., during a second subframe, third subframe, etc.), in which case the UE may dynamically identify the later subframe of the transmission window as a starting subframe 430 of an uplink transmission. In some examples, an uplink transmission transmitted in accordance with the uplink grant need only start within the transmission window 410, and may continue past the end of the transmission window 410.

In some examples, the network access device may transmit an indication of the LBT procedure to be used by the UE when contending for access to the channel of the shared radio frequency spectrum band at time t2. In some examples, the indication of the LBT procedure may be transmitted in at least one of an uplink grant, RRC signaling 435, a transmission of system information 440 (e.g., in a system information block (SIB) or a master information block (MIB)), a UE-specific transmission, a cell-specific transmission, semi-persistent scheduling (SPS) information 445, or a combination thereof.

In some examples, the network access device may transmit at least one parameter of the transmission window 410. In some examples, the at least one parameter may include a first indication of a start of the transmission window 410, a second indication of an end of the transmission window 410, a third indication of the duration of the transmission window 410, or a combination thereof. In some examples, the first indication, the second indication, and/or the third indication may be relative to a channel occupancy time (e.g., the COT 1 405) of the network access device. For example, the first indication may indicate that the transmission window 410 starts 1 ms after an end of a reservation of the channel by the network access device (e.g., 1 ms after the end of the COT 1 405). In some examples, the network access device may transmit the at least one parameter in at least one of an uplink grant, RRC signaling 435, a transmission of system information 440 (e.g., in a SIB or a MIB), a UE-specific transmission, a cell-specific transmission, SPS information 445, or a combination thereof.

In some examples, an uplink grant to transmit on the channel of the shared radio frequency spectrum band outside the COT 1 405 may be transmitted prior to the downlink period 415 of the COT 1 405. For example, an uplink grant to transmit on the channel of the shared radio frequency spectrum band outside a reservation of the channel by the network access device (e.g., outside the COT 1 405) may be transmitted in SPS information 445 (or in other signaling of semi-static information), and by default may apply to transmissions outside each of a number of reservations of the channel (COTs) by the network access device. In these examples, the network access device may transmit, during a reservation of the channel by the network access device (e.g., during the COT 1 405), an indication of whether the uplink grant is active or inactive for the transmission window 410 following the reservation (e.g., the COT 1 405). In some examples, the indication of whether the uplink grant is active or inactive may be signaled in a common physical downlink control channel (PDCCH). In some examples, the indication of whether the uplink grant is active or inactive may be a state of a bit or field. In other examples, the indication of whether the uplink grant is active or inactive may be the presence of a bit or field.

In some examples, the size of the transmission window 410 may be on the order of an average transmission time (or maximum transmission time) of nodes near, but hidden from, the network access device (i.e., hidden nodes). In some examples, the average/maximum transmission time of the hidden nodes, and the size of the transmission window 410, may be on the order of 4 ms to 8 ms. Sizing the transmission window 410 in this manner enables a UE to gain access to the channel of the shared radio frequency spectrum band under most contention scenarios (e.g., because a hidden node that begins transmitting over the channel just prior to the start of the transmission window 410 should finish its transmission before the end of the transmission window 410, thereby giving the UE an opportunity to gain access to the channel in begin an uplink transmission within the transmission window 410). In some examples, the transmission window 410 may be sized smaller than (or no larger than) the average/maximum transmission time of hidden nodes, because a transmission window 410 of larger duration reduces the channel access opportunities for the network access device; or the transmission window 410 may be sized to balance (or weight) increasing the probability that the UE will be able to access the channel during the transmission window 410, and providing channel access opportunities for the network access device. In some examples, changes in the size of a transmission window 410 following a reservation of a channel by a network access device may be made slowly.

In some examples, a network access device may not (or may not be able to) provide a UE an uplink grant as described with reference to FIG. 3 or 4, or a network access device may not know that a UE has traffic to transmit, or a UE may have more data to transmit than a network access device has provided uplink grants for, or there may be hidden nodes that prevent a UE from gaining access to a channel of a shared radio frequency spectrum band and using an uplink grant at the time(s) indicated by a network access device. In these and other examples, it may be useful to provide the UE with opportunities (or additional opportunities) to transmit a scheduling request (SR).

Figure 5:
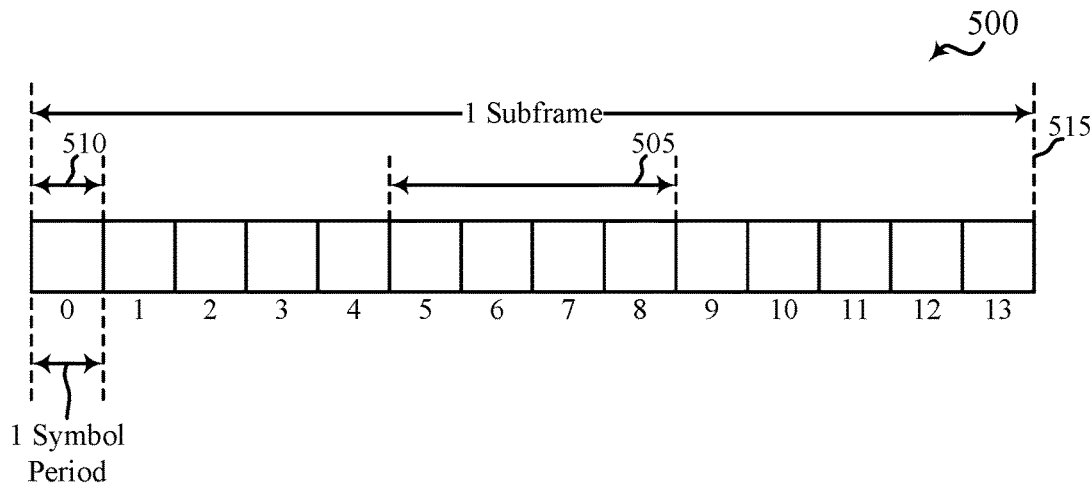
FIG. 5 shows a subframe of communications over a channel of a shared radio frequency spectrum band, in accordance with various aspects of the present disclosure.

FIG. 5 shows a subframe 500 of communications over a channel of a shared radio frequency spectrum band, in accordance with various aspects of the present disclosure. Under some conditions, a portion 505 of the subframe 500 may be used, by a UE, to transmit a SR to a network access device. In some examples, the network access device may include aspects of one or more of the base stations 105 described with reference to FIG. 1 or 2, and/or the UE may include aspects of one or more of the UEs 115 described with reference to FIG. 1 or 2.

The subframe 500 may be outside a reservation of the channel by the network access device (e.g., outside the COT 1 305 or 405 described with reference to FIG. 3 or 4). By way of example, the subframe 500 is shown to include 14 symbol periods, numbered 0 to 13. In other examples, the subframe 500 may include a different number of symbol periods. A first portion 510 of the subframe 500, such as the first symbol period, may be designated for a reference signal transmission (e.g., a cell-specific reference signal (CRS)) by a network access device that has reserved the channel for the subframe 500. A second portion 505 of the subframe 500, such as the center four symbol periods of the subframe 500, may be designated for SR transmissions by UEs that detect an absence of a reference signal transmission in the first portion 510 of the subframe 500. In some examples, the second portion 505 may be separated from the first portion 510, in time, to give a UE time to detect whether a reference signal transmission has been made in the first portion 510, then contend for access to the channel prior to (or at a start of) the second portion 505, and then transmit in the second portion 505.

In some examples, a network access device that both 1) identifies the subframe 500 as outside a reservation of the channel by the network access device, and 2) does not transmit a reference signal (e.g., a CRS) during the first portion 510 of the subframe 500, may monitor the second portion 505 of the subframe 500 for SR transmissions. When the network access device receives a SR transmission from a UE, the network access device may transmit an uplink grant to the UE based at least in part on the SR transmission. When the network access device detects an absence of SR transmissions during the second portion 505 of the subframe 500, the network access device may contend for access to the channel of the shared radio frequency spectrum band, or transmit over the channel of the shared radio frequency spectrum band, during a next subframe following the subframe 500 (e.g., beginning at a leading subframe boundary 515 of the next subframe).

In some examples, a UE that both 1) identifies the subframe 500 as being outside a reservation of the channel by a network access device, and 2) detects an absence of a reference signal transmission (e.g., a CRS transmission) during the first portion 510 of the subframe 500, may transmit a SR in the second portion 505 of the subframe 500. In some examples, the UE may need to contend for and gain access to the channel of the shared radio frequency spectrum band, based at least in part on a LBT procedure (e.g., a CAT 4 LBT procedure associated with priority class 1), prior to transmitting the SR. In some examples, the UE may receive an uplink grant based at least in part on the SR.

In some examples, an SR transmitted in the second portion 505 of the subframe 500 may be (or be part of) a random access transmission (e.g., a simple physical random access channel (sPRACH) transmission) or a buffer status report (BSR) transmission.

Figure 6:
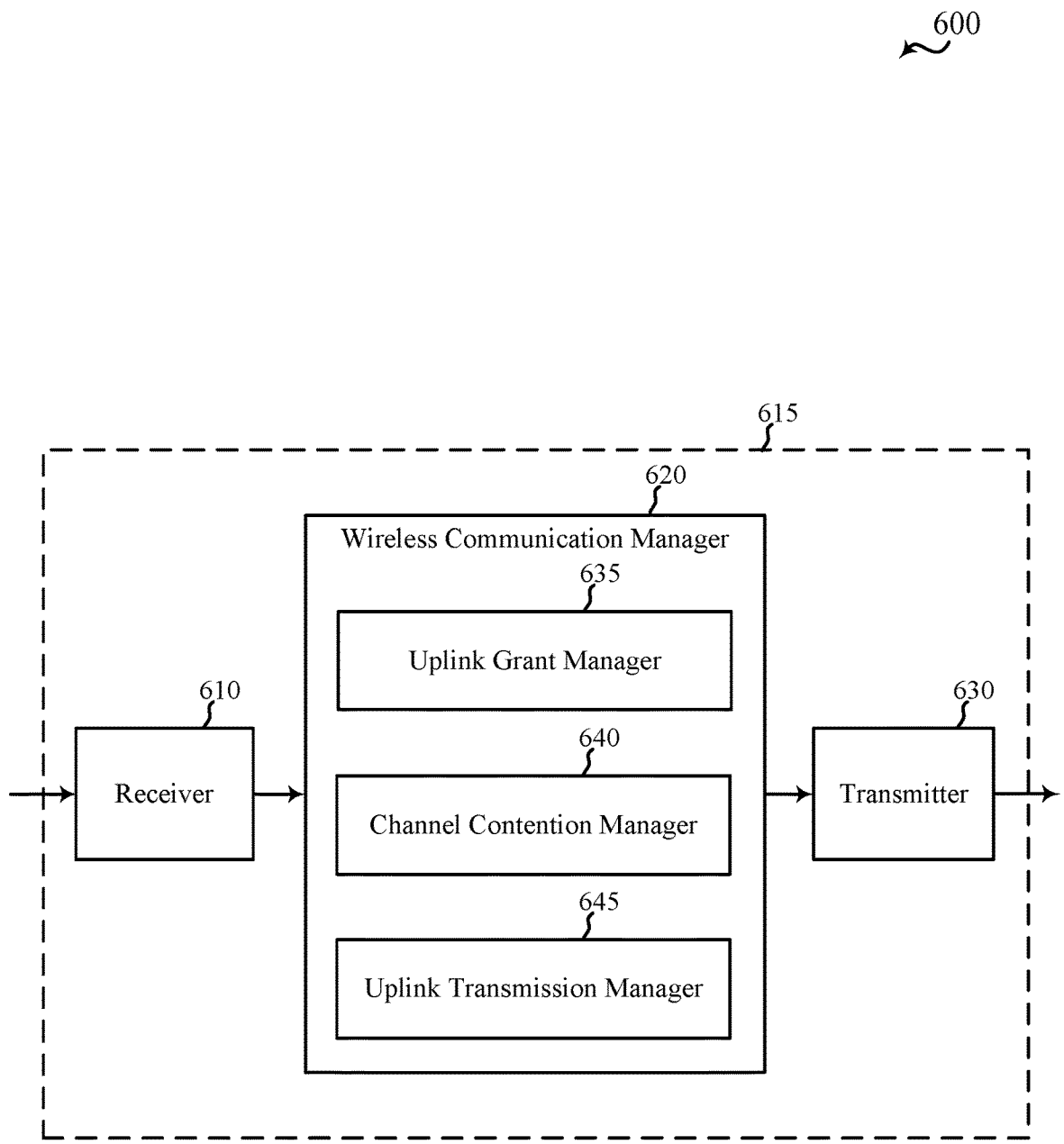
FIG. 6 shows a block diagram of an apparatus for use in wireless communication, in accordance with various aspects of the present disclosure.

FIG. 6 shows a block diagram 600 of an apparatus 615 for use in wireless communication, in accordance with various aspects of the present disclosure. The apparatus 615 may be an example of aspects of one or more of the UEs 115, 215, 215-a, or 215-b described with reference to FIG. 1 or 2. The apparatus 615 may also be or include a processor. The apparatus 615 may include a receiver 610, a wireless communication manager 620, or a transmitter 630. Each of these components may be in communication with each other.

The components of the apparatus 615 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 610 may include at least one radio frequency (RF) receiver, such as at least one RF receiver operable to receive transmissions over a dedicated radio frequency spectrum band (e.g., a radio frequency spectrum band licensed to particular users for particular uses) or a shared radio frequency spectrum band (e.g., a radio frequency spectrum band available for Wi-Fi use, a radio frequency spectrum band available for use by different radio access technologies, or a radio frequency spectrum band available for use by multiple MNOs in an equally shared or prioritized manner). In some examples, the dedicated radio frequency spectrum band or the shared radio frequency spectrum band may be used for LTE/LTE-A communications, as described, for example, with reference to FIG. 1, 2, 3, 4, or 5. The receiver 610 may be used to receive various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 630 may include at least one RF transmitter, such as at least one RF transmitter operable to transmit over the dedicated radio frequency spectrum band or the shared radio frequency spectrum band. The transmitter 630 may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 620 may be used to manage one or more aspects of wireless communication for the apparatus 615. In some examples, part of the wireless communication manager 620 may be incorporated into or shared with the receiver 610 or the transmitter 630. In some examples, the wireless communication manager 620 may include an uplink grant manager 635, a channel contention manager 640, or an uplink transmission manager 645.

The uplink grant manager 635 may be used to receive, from a network access device, an uplink grant to transmit over a channel of a shared radio frequency spectrum band. The uplink grant may indicate a number of subframes and a transmission window having a duration of a plurality of subframes. In some examples, the transmission window may be outside a reservation of the channel by the network access device (e.g., outside all reservations of the channel by the network access device).

The channel contention manager 640 may be used to contend for access to the channel of the shared radio frequency spectrum band based at least in part on a LBT procedure and in accordance with the uplink grant (e.g., during the transmission window).

The uplink transmission manager 645 may be used to transmit an uplink transmission over the channel of the shared radio frequency spectrum band, in accordance with the uplink grant. A starting subframe of the uplink transmission may be based at least in part on the LBT procedure and may be within the transmission window.

In some examples, the channel contention manager 640 may be used to receive an indication of the LBT procedure to be performed when contending for access to the channel of the shared radio frequency spectrum band. The indication may be received in at least one of the uplink grant, RRC signaling, a transmission of system information (e.g., in a SIB or a MIB), a UE-specific transmission, a cell-specific transmission, SPS information, or a combination thereof.

In some examples, the uplink grant manager 635 may be used to receive and pass to the channel contention manager 640 at least one parameter of the transmission window. In some examples, the at least one parameter may include a first indication of a start of the transmission window, a second indication of an end of the transmission window, a third indication of the duration of the transmission window, or a combination thereof. In some examples, the first indication, the second indication, or the third indication may be relative to a channel occupancy time of the network access device.

In some examples, the uplink grant manager 635 may be used to receive the uplink grant in SPS information. In these examples, the uplink grant manager 635 may be used to receive, during a reservation of the channel by the network access device, an indication that the uplink grant is active for the transmission window (or conversely, an indication that the uplink grant is inactive for the transmission window).

Figure 7:
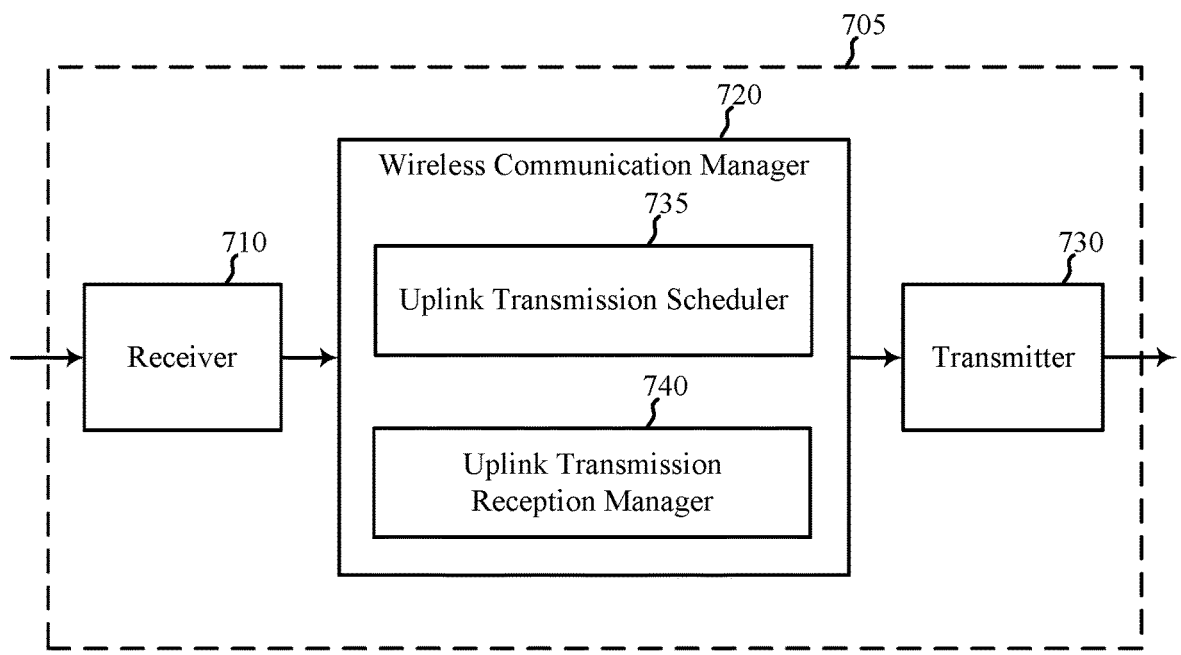
FIG. 7 shows a block diagram of an apparatus for use in wireless communication, in accordance with various aspects of the present disclosure.

FIG. 7 shows a block diagram 700 of an apparatus 705 for use in wireless communication, in accordance with various aspects of the present disclosure. The apparatus 705 may be an example of aspects of one or more of the base stations 105, 205, or 205-a described with reference to FIG. 1 or 2, or an example of another type of network access device. The apparatus 705 may also be or include a processor. The apparatus 705 may include a receiver 710, a wireless communication manager 720, or a transmitter 730. Each of these components may be in communication with each other.

The components of the apparatus 705 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 710 may include at least one RF receiver, such as at least one RF receiver operable to receive transmissions over a dedicated radio frequency spectrum band (e.g., a radio frequency spectrum band licensed to particular users for particular uses) or a shared radio frequency spectrum band (e.g., a radio frequency spectrum band available for Wi-Fi use, a radio frequency spectrum band available for use by different radio access technologies, or a radio frequency spectrum band available for use by multiple MNOs in an equally shared or prioritized manner). In some examples, the dedicated radio frequency spectrum band or the shared radio frequency spectrum band may be used for LTE/LTE-A communications, as described, for example, with reference to FIG. 1, 2, 3, 4, or 5. The receiver 710 may be used to receive various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 730 may include at least one RF transmitter, such as at least one RF transmitter operable to transmit over the dedicated radio frequency spectrum band or the shared radio frequency spectrum band. The transmitter 730 may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 720 may be used to manage one or more aspects of wireless communication for the apparatus 705. In some examples, part of the wireless communication manager 720 may be incorporated into or shared with the receiver 710 or the transmitter 730. In some examples, the wireless communication manager 720 may include an uplink transmission scheduler 735 or an uplink transmission reception manager 740.

The uplink transmission scheduler 735 may be used to transmit an uplink grant to transmit over a channel of a shared radio frequency spectrum band. The uplink grant may indicate a number of subframes and a transmission window having a duration of a plurality of subframes. In some examples, the transmission window may be outside a reservation of the channel by the apparatus 705 (e.g., outside all reservations of the channel by the apparatus 705).

The uplink transmission reception manager 740 may be used to monitor for a starting subframe of an uplink transmission, in accordance with the uplink grant, during the transmission window. The uplink transmission reception manager 740 may also be used to receive the uplink transmission over the channel of the shared radio frequency spectrum band, in accordance with the uplink grant.

In some examples, the uplink transmission scheduler 735 may be used to transmit an indication of a LBT procedure to be performed by a UE when contending for access to the channel of the shared radio frequency spectrum band. The LBT procedure may be performed by the UE to gain access to the shared radio frequency spectrum band in accordance with the uplink grant (e.g., during the transmission window). The indication may be transmitted in at least one of the uplink grant, RRC signaling, a transmission of system information (e.g., in a SIB or a MIB), a UE-specific transmission, a cell-specific transmission, SPS information, or a combination thereof.

In some examples, the uplink transmission scheduler 735 may be used to transmit at least one parameter of the transmission window. In some examples, the at least one parameter may include a first indication of a start of the transmission window, a second indication of an end of the transmission window, a third indication of the duration of the transmission window, or a combination thereof. In some examples, the first indication, the second indication, or the third indication may be relative to a channel occupancy time of the apparatus 705. In some examples, the at least one parameter of the transmission window may be transmitted in at least one of the uplink grant, RRC signaling, a transmission of system information, a UE-specific transmission, a cell-specific transmission, SPS information, or a combination thereof.

In some examples, the uplink transmission scheduler 735 may be used to transmit the uplink grant in SPS information. In these examples, the uplink transmission scheduler 735 may be used to transmit, during a reservation of the channel by the apparatus 705, an indication that the uplink grant is active for the transmission window (or conversely, an indication that the uplink grant is inactive for the transmission window).

Figure 8:
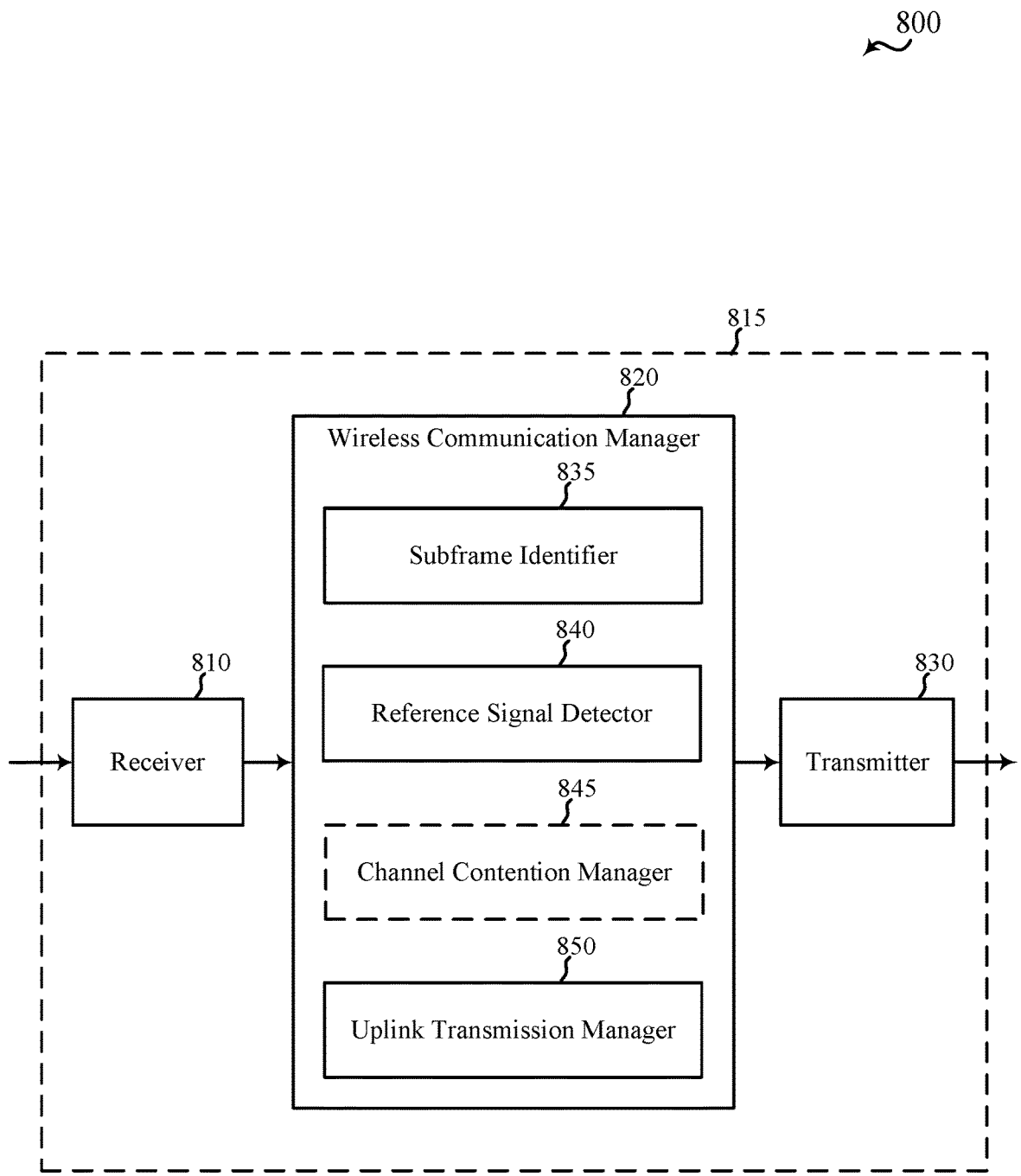
FIG. 8 shows a block diagram of an apparatus for use in wireless communication, in accordance with various aspects of the present disclosure.

FIG. 8 shows a block diagram 800 of an apparatus 815 for use in wireless communication, in accordance with various aspects of the present disclosure. The apparatus 815 may be an example of aspects of one or more of the UEs 115, 215, 215-a, or 215-b described with reference to FIG. 1 or 2. The apparatus 815 may also be or include a processor. The apparatus 815 may include a receiver 810, a wireless communication manager 820, or a transmitter 830. Each of these components may be in communication with each other.

The components of the apparatus 815 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 810 may include at least one RF receiver, such as at least one RF receiver operable to receive transmissions over a dedicated radio frequency spectrum band (e.g., a radio frequency spectrum band licensed to particular users for particular uses) or a shared radio frequency spectrum band (e.g., a radio frequency spectrum band available for Wi-Fi use, a radio frequency spectrum band available for use by different radio access technologies, or a radio frequency spectrum band available for use by multiple MNOs in an equally shared or prioritized manner). In some examples, the dedicated radio frequency spectrum band or the shared radio frequency spectrum band may be used for LTE/LTE-A communications, as described, for example, with reference to FIG. 1, 2, 3, 4, or 5. The receiver 810 may be used to receive various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 830 may include at least one RF transmitter, such as at least one RF transmitter operable to transmit over the dedicated radio frequency spectrum band or the shared radio frequency spectrum band. The transmitter 830 may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 820 may be used to manage one or more aspects of wireless communication for the apparatus 815. In some examples, part of the wireless communication manager 820 may be incorporated into or shared with the receiver 810 or the transmitter 830. In some examples, the wireless communication manager 820 may include a subframe identifier 835, a reference signal detector 840, an optional channel contention manager 845, or an uplink transmission manager 850.

The subframe identifier 835 may be used to identify a subframe, of a channel of a shared radio frequency spectrum band, that is outside a reservation of the channel by a network access device (e.g., outside all reservations of the channel by the network access device).

The reference signal detector 840 may be used to detect an absence of a reference signal transmission (e.g., a CRS transmission) by the network access device in the subframe.

The channel contention manager 845 may be used to contend for access to the channel of the shared radio frequency spectrum band, prior to transmitting a SR in the subframe, based at least in part on a LBT procedure.

The uplink transmission manager 850 may be used to transmit in the subframe, based at least in part on the detected absence of the reference signal transmission (and in some examples, based at least in part on the LBT procedure), the SR. In some examples, the SR may be transmitted in a subset of symbol periods of the subframe, the subset of symbol periods starting after a first symbol period of the subframe (e.g., a center four symbol periods of the subframe). The uplink transmission manager 850 may also be used to receive an uplink grant based at least in part on the SR.

Figure 9:
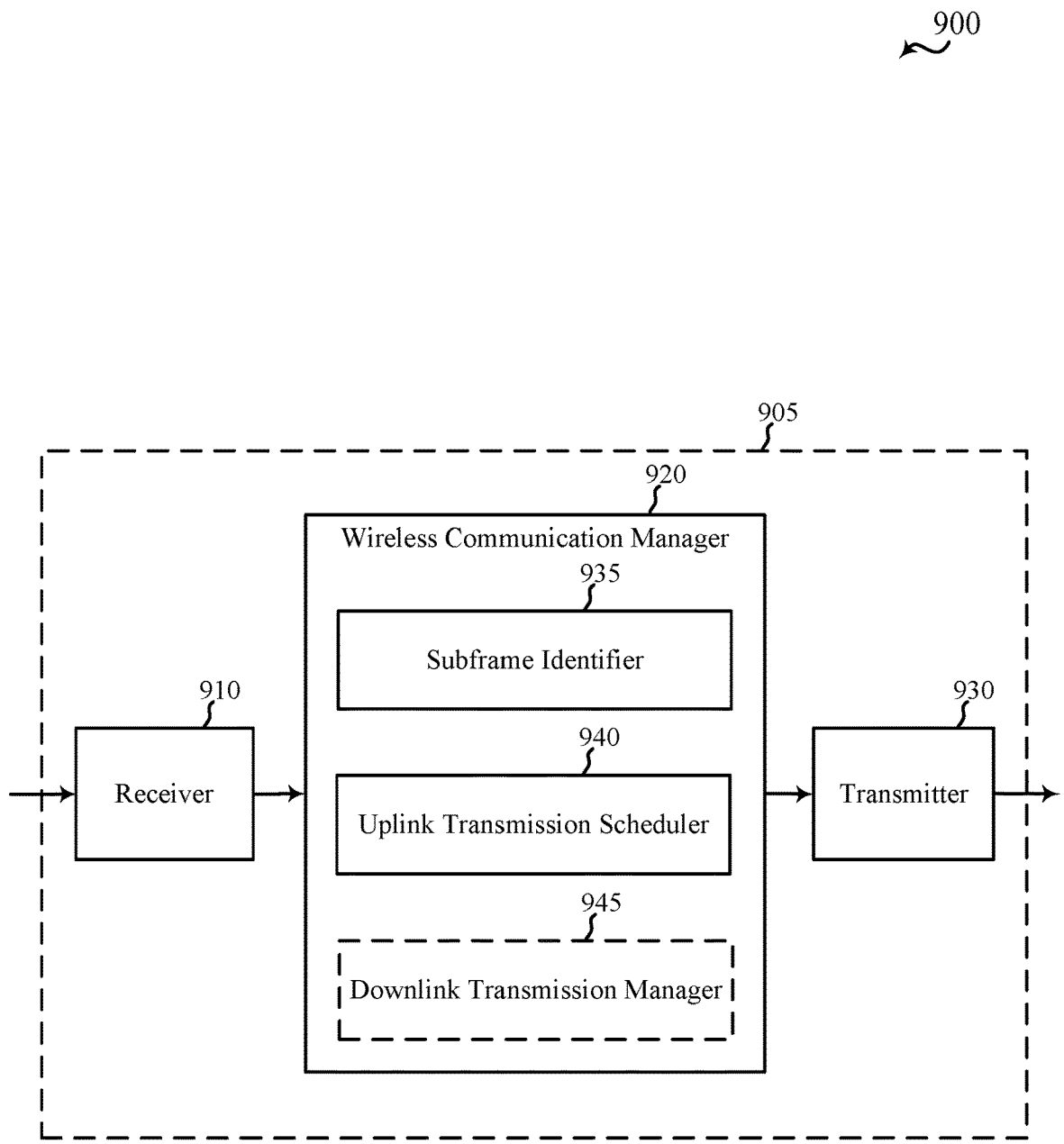
FIG. 9 shows a block diagram of an apparatus for use in wireless communication, in accordance with various aspects of the present disclosure.

FIG. 9 shows a block diagram 900 of an apparatus 905 for use in wireless communication, in accordance with various aspects of the present disclosure. The apparatus 905 may be an example of aspects of one or more of the base stations 105, 205, or 205-a described with reference to FIG. 1 or 2, or an example of another type of network access device. The apparatus 905 may also be or include a processor. The apparatus 905 may include a receiver 910, a wireless communication manager 920, or a transmitter 930. Each of these components may be in communication with each other.

The components of the apparatus 905 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 910 may include at least one RF receiver, such as at least one RF receiver operable to receive transmissions over a dedicated radio frequency spectrum band (e.g., a radio frequency spectrum band licensed to particular users for particular uses) or a shared radio frequency spectrum band (e.g., a radio frequency spectrum band available for Wi-Fi use, a radio frequency spectrum band available for use by different radio access technologies, or a radio frequency spectrum band available for use by multiple MNOs in an equally shared or prioritized manner). In some examples, the dedicated radio frequency spectrum band or the shared radio frequency spectrum band may be used for LTE/LTE-A communications, as described, for example, with reference to FIG. 1, 2, 3, 4, or 5. The receiver 910 may be used to receive various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 930 may include at least one RF transmitter, such as at least one RF transmitter operable to transmit over the dedicated radio frequency spectrum band or the shared radio frequency spectrum band. The transmitter 930 may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 920 may be used to manage one or more aspects of wireless communication for the apparatus 905. In some examples, part of the wireless communication manager 920 may be incorporated into or shared with the receiver 910 or the transmitter 930. In some examples, the wireless communication manager 920 may include a subframe identifier 935, an uplink transmission scheduler 940, or a downlink transmission manager 945.

The subframe identifier 935 may be used to identify a subframe of a channel of a shared radio frequency spectrum band based at least in part on the subframe being outside a reservation of the channel by the apparatus 905, and based at least in part on an absence of a reference signal transmission (e.g., a CRS transmission) by the apparatus 905 in the subframe.

The uplink transmission scheduler 940 may be used to monitor a portion of the subframe for SR transmissions. In some examples, the monitored portion of the subframe may include a subset of symbol periods of the subframe, the subset of symbol periods starting after a first symbol period of the subframe (e.g., a center four symbol periods of the subframe). The uplink transmission scheduler 940 may also be used to receive a SR transmission from a UE. The uplink transmission scheduler 940 may further be used to transmit an uplink grant to the UE based at least in part on the SR transmission. Alternatively, the uplink transmission scheduler 940 may be used to detect an absence of the SR transmissions during the monitored portion of the subframe.

The downlink transmission manager 945 may be used, based at least in part on a detected absence of the SR transmissions during the monitored portion, to contend for access to the channel of the shared radio frequency spectrum band, or to transmit over the channel of the shared radio frequency spectrum band, during a next subframe following the subframe that includes the monitored portion.

Figure 10:
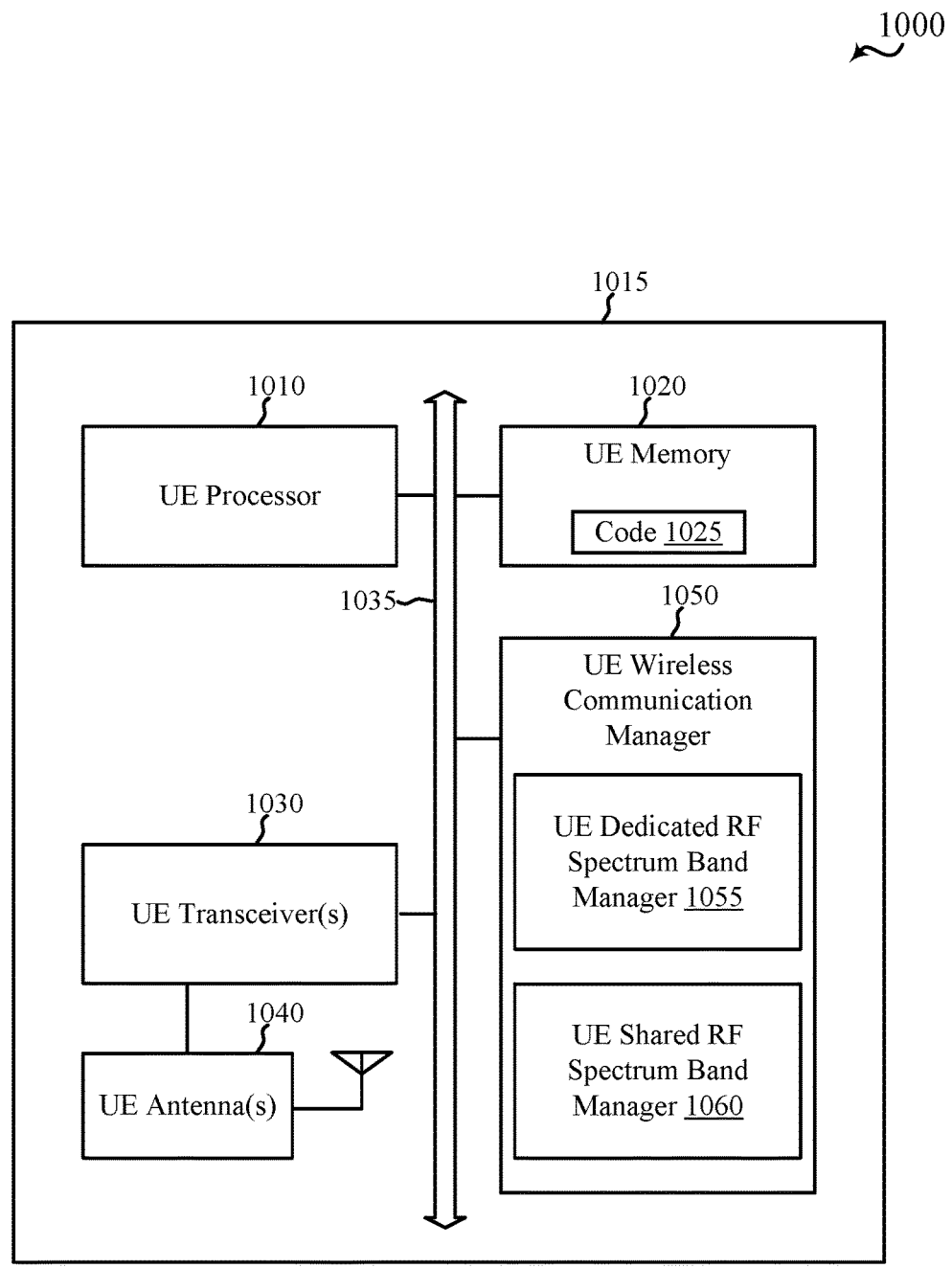
FIG. 10 shows a block diagram of a UE for use in wireless communication, in accordance with various aspects of the present disclosure.

FIG. 10 shows a block diagram 1000 of a UE 1015 for use in wireless communication, in accordance with various aspects of the present disclosure. The UE 1015 may be included or be part of a personal computer (e.g., a laptop computer, a netbook computer, a tablet computer, etc.), a cellular telephone, a PDA, a DVR, an internet appliance, a gaming console, an e-reader, etc. The UE 1015 may, in some examples, have an internal power supply (not shown), such as a small battery, to facilitate mobile operation. In some examples, the UE 1015 may be an example of aspects of one or more of the UEs 115, 215, 215-a, or 215-b described with reference to FIG. 1 or 2, or aspects of the apparatus 615 or 815 described with reference to FIG. 6 or 8. The UE 1015 may be configured to implement at least some of the UE or apparatus techniques and functions described with reference to FIG. 1, 2, 3, 4, 5, 6, or 8.

The UE 1015 may include a UE processor 1010, a UE memory 1020, at least one UE transceiver (represented by UE transceiver(s) 1030), at least one UE antenna (represented by UE antenna(s) 1040), or a UE wireless communication manager 1050. Each of these components may be in communication with each other, directly or indirectly, over one or more buses 1035.

The UE memory 1020 may include random access memory (RAM) or read-only memory (ROM). The UE memory 1020 may store computer-readable, computer-executable code 1025 containing instructions that are configured to, when executed, cause the UE processor 1010 to perform various functions described herein related to wireless communication, including, for example, transmitting an uplink transmission in accordance with an uplink grant that indicates a number of subframes and a transmission window having a plurality of subframes; transmitting a SR in a subframe that is outside a reservation of a channel by a network access device, based at least in part on detecting an absence of a reference signal transmission by the network access device in the subframe; etc. Alternatively, the computer-executable code 1025 may not be directly executable by the UE processor 1010 but be configured to cause the UE 1015 (e.g., when compiled and executed) to perform various of the functions described herein.

The UE processor 1010 may include an intelligent hardware device, e.g., a central processing unit (CPU), a microcontroller, an ASIC, etc. The UE processor 1010 may process information received through the UE transceiver(s) 1030 or information to be sent to the UE transceiver(s) 1030 for transmission through the UE antenna(s) 1040. The UE processor 1010 may handle, alone or in connection with the UE wireless communication manager 1050, various aspects of communicating over (or managing communications over) a dedicated radio frequency spectrum band or a shared radio frequency spectrum band.

The UE transceiver(s) 1030 may include a modem configured to modulate packets and provide the modulated packets to the UE antenna(s) 1040 for transmission, and to demodulate packets received from the UE antenna(s) 1040. The UE transceiver(s) 1030 may, in some examples, be implemented as one or more UE transmitters and one or more separate UE receivers. The UE transceiver(s) 1030 may support communications in the dedicated radio frequency spectrum band or the shared radio frequency spectrum band. The UE transceiver(s) 1030 may be configured to communicate bi-directionally, via the UE antenna(s) 1040, with one or more network access devices (e.g., base stations or radio heads) or apparatuses, such as one or more of the base stations 105, 205, or 205-a described with reference to FIG. 1 or 2, or one or more of the apparatuses 705 or 905 described with reference to FIG. 7 or 9. While the UE 1015 may include a single UE antenna, there may be examples in which the UE 1015 may include multiple UE antennas 1040.

The UE wireless communication manager 1050 may be configured to perform or control some or all of the UE or apparatus techniques or functions described with reference to FIG. 1, 2, 3, 4, 5, 6, or 8 related to wireless communication over the dedicated radio frequency spectrum band or the shared radio frequency spectrum band. For example, the UE wireless communication manager 1050 may be configured to support a supplemental downlink mode (e.g., a licensed assisted access mode), a carrier aggregation mode (e.g., an enhanced licensed assisted access mode), or a standalone mode using the dedicated radio frequency spectrum band or the shared radio frequency spectrum band. The UE wireless communication manager 1050 may include a UE dedicated RF spectrum band manager 1055 configured to handle communications in the dedicated radio frequency spectrum band, and a UE shared RF spectrum band manager 1060 configured to handle communications in the shared radio frequency spectrum band. The UE wireless communication manager 1050, or portions of it, may include a processor, or some or all of the functions of the UE wireless communication manager 1050 may be performed by the UE processor 1010 or in connection with the UE processor 1010. In some examples, the UE wireless communication manager 1050 may be an example of the wireless communication manager 620 or 820 described with reference to FIG. 6 or 8.

Figure 11:
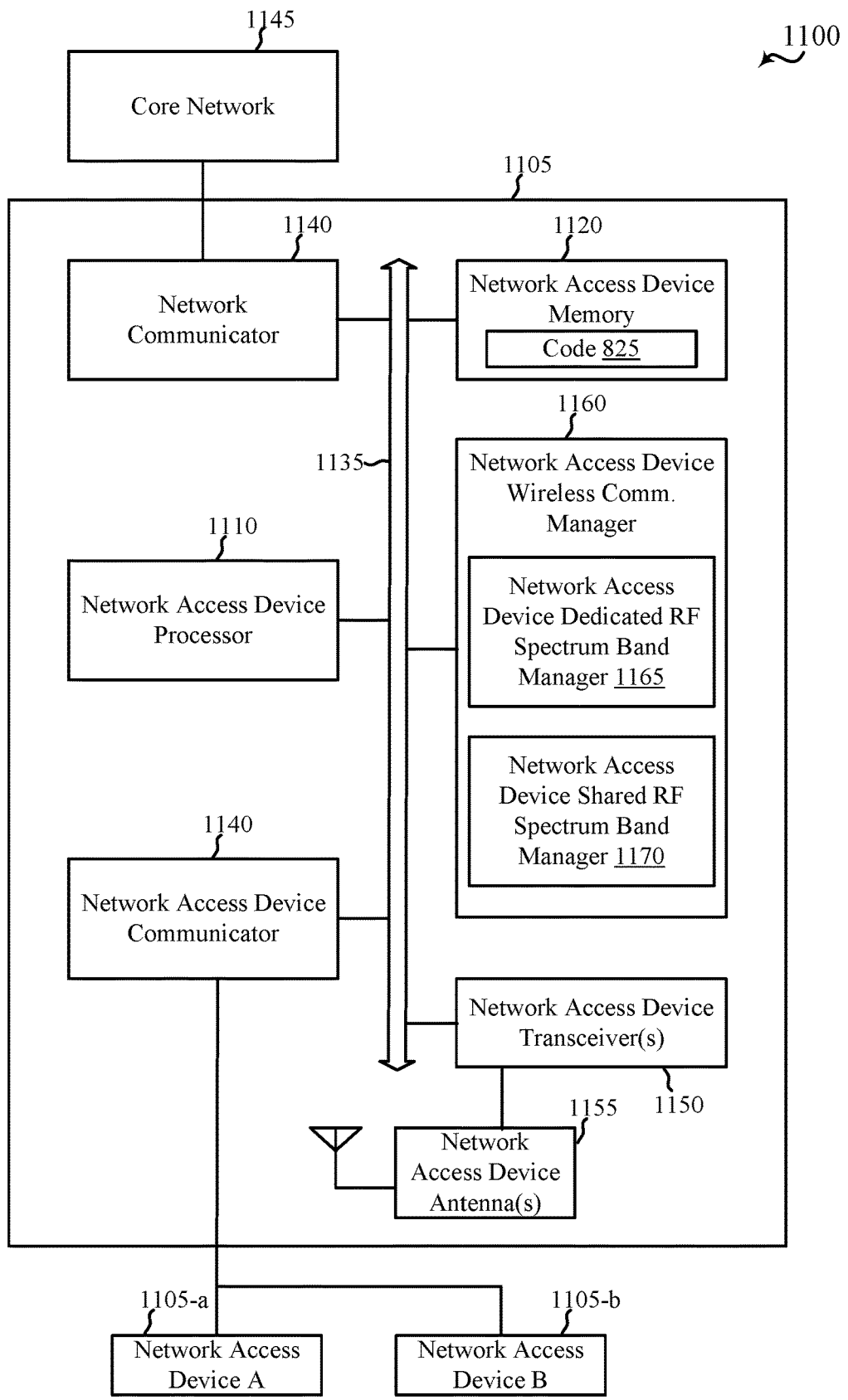
FIG. 11 shows a block diagram of a network access device (e.g., a base station or radio head) for use in wireless communication, in accordance with various aspects of the present disclosure.

FIG. 11 shows a block diagram 1100 of a network access device 1105 (e.g., a base station or radio head) for use in wireless communication, in accordance with various aspects of the present disclosure. In some examples, the network access device 1105 may be an example of one or more aspects of the base stations 105, 205, or 205-*a* described with reference to FIG. 1 or 2, or aspects of the apparatus 705 or 905 described with reference to FIG. 7 or 9. The network access device 1105 may be configured to implement or facilitate at least some of the network access device, base station, or apparatus techniques and functions described with reference to FIG. 1, 2, 3, 4, 5, 7, or 9.

The network access device 1105 may include a network access device processor 1110, a network access device memory 1120, at least one network access device transceiver (represented by network access device transceiver(s) 1150), at least one network access device antenna (represented by network access device antenna(s) 1155), or a network access device wireless communication manager 1160. The network access device 1105 may also include one or more of a network access device communicator 1130 or a network communicator 1140. Each of these components may be in communication with each other, directly or indirectly, over one or more buses 1135.

The network access device memory 1120 may include RAM or ROM. The network access device memory 1120 may store computer-readable, computer-executable code 1125 containing instructions that are configured to, when executed, cause the network access device processor 1110 to perform various functions described herein related to wireless communication, including, for example, transmitting an uplink grant to a UE, in which the uplink grant indicates a number of subframes and a transmission window having a plurality of subframes; monitoring for SR transmissions in a subframe that is outside a reservation of a channel by the network access device 1105, based at least in part on an absence of a reference signal transmission by the network access device in the subframe; etc. Alternatively, the computer-executable code 1125 may not be directly executable by the network access device processor 1110 but be configured to cause the network access device 1105 (e.g., when compiled and executed) to perform various of the functions described herein.

The network access device processor 1110 may include an intelligent hardware device, e.g., a CPU, a microcontroller, an ASIC, etc. The network access device processor 1110 may process information received through the network access device transceiver(s) 150, the network access device communicator 1130, or the network communicator 1140. The network access device processor 1110 may also process information to be sent to the transceiver(s) 1150 for transmission through the antenna(s) 1155, to the network access device communicator 1130, for transmission to one or more other network access devices (e.g., network access device 1105-*a* and/or network access device 1105-*b*), or to the network communicator 1140 for transmission to a core network 1145, which may be an example of one or more aspects of the core network 130 described with reference to FIG. 1. The network access device processor 1110 may handle, alone or in connection with the network access device wireless communication manager 1160, various aspects of communicating over (or managing communications over) a dedicated radio frequency spectrum band or a shared radio frequency spectrum band.

The network access device transceiver(s) 1150 may include a modem configured to modulate packets and provide the modulated packets to the network access device antenna(s) 1155 for transmission, and to demodulate packets received from the network access device antenna(s) 1155. The network access device transceiver(s) 1150 may, in some examples, be implemented as one or more network access device transmitters and one or more separate network access device receivers. The network access device transceiver(s) 1150 may support communications in the dedicated radio frequency spectrum band or the shared radio frequency spectrum band. The network access device transceiver(s) 1150 may be configured to communicate bi-directionally, via the network access device antenna(s) 1155, with one or more UEs or apparatuses, such as one or more of the UEs 115, 215, 215-*a*, 215-*b*, or 1015 described with reference to FIG. 1, 2, or 10, or one or more of the apparatuses 615 or 815 described with reference to FIG. 6 or 8. The network access device 1105 may, for example, include multiple network access device antennas 1155 (e.g., an antenna array). The network access device 1105 may communicate with the core network 1145 through the network communicator 1140. The network access device 1105 may also communicate with other network access devices, such as the network access device 1105-*a* and/or the network access device 1105-*b*, using the network access device communicator 1130.

The network access device wireless communication manager 1160 may be configured to perform or control some or all of the techniques or functions described with reference to FIG. 1, 2, 3, 4, 5, 7, or 9 related to wireless communication over the dedicated radio frequency spectrum band or the shared radio frequency spectrum band. For example, the network access device wireless communication manager 1160 may be configured to support a supplemental downlink mode (e.g., a licensed assisted access mode), a carrier aggregation mode (e.g., an enhanced licensed assisted access mode), or a standalone mode using the dedicated radio frequency spectrum band or the shared radio frequency spectrum band. The network access device wireless communication manager 1160 may include a network access device dedicated RF spectrum band manager 1165 configured to handle communications in the dedicated radio frequency spectrum band, and a network access device shared RF spectrum band manager 1170 configured to handle communications in the shared radio frequency spectrum band. The network access device wireless communication manager 1160, or portions of it, may include a processor, or some or all of the functions of the network access device wireless communication manager 1160 may be performed by the network access device processor 1110 or in connection with the network access device processor 1110. In some examples, the network access device wireless communication manager 1160 may be an example of the wireless communication manager 720 or 920 described with reference to FIG. 7 or 9.

Figure 12:
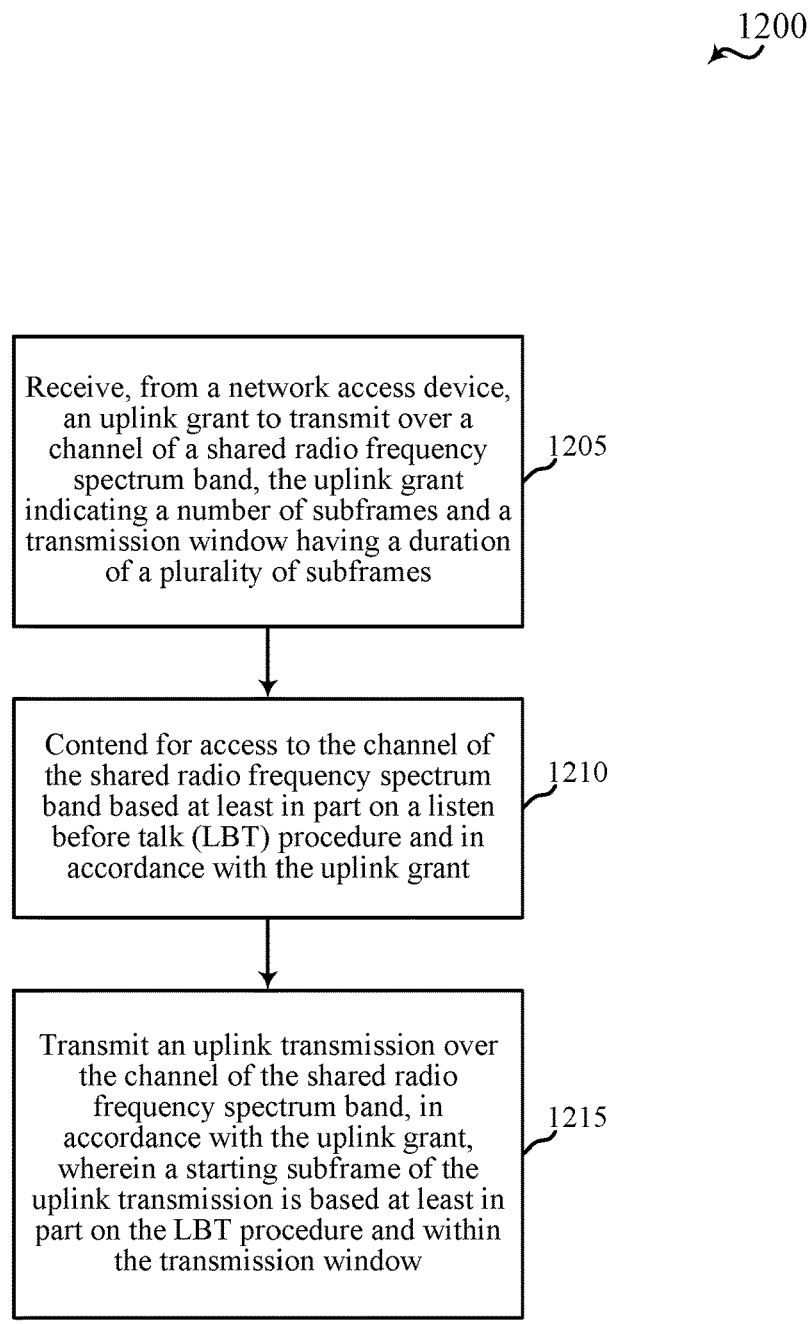
FIG. 12 is a flow chart illustrating an example of a method for wireless communication at a UE, in accordance with various aspects of the present disclosure.

FIG. 12 is a flow chart illustrating an example of a method 1200 for wireless communication at a UE, in accordance with various aspects of the present disclosure. For clarity, the method 1200 is described below with reference to aspects of one or more of the UEs 115, 215, 215-a, 215-b, or 1015 described with reference to FIG. 1, 2, or 10, or aspects of the apparatus 615 described with reference to FIG. 6. In some examples, a UE may execute one or more sets of codes to control the functional elements of the UE to perform the functions described below. Additionally or alternatively, the UE may perform one or more of the functions described below using special-purpose hardware.

At block 1205, the method 1200 may include receiving, from a network access device, an uplink grant to transmit over a channel of a shared radio frequency spectrum band. The uplink grant may indicate a number of subframes and a transmission window having a duration of a plurality of subframes. In some examples, the transmission window may be outside a reservation of the channel by the network access device (e.g., outside all reservations of the channel by the network access device). The operation(s) at block 1205 may be performed using the wireless communication manager 620 described with reference to FIG. 6, the UE wireless communication manager 1050 described with reference to FIG. 10, or the uplink grant manager 635 described with reference to FIG. 6.

At block 1210, the method 1200 may include contending for access to the channel of the shared radio frequency spectrum band based at least in part on a LBT procedure and in accordance with the uplink grant (e.g., during the transmission window). The operation(s) at block 1210 may be performed using the wireless communication manager 620 described with reference to FIG. 6, the UE wireless communication manager 1050 described with reference to FIG. 10, or the channel contention manager 640 described with reference to FIG. 6.

At block 1215, the method 1200 may include transmitting an uplink transmission over the channel of the shared radio frequency spectrum band, in accordance with the uplink grant. A starting subframe of the uplink transmission may be based at least in part on the LBT procedure and may be within the transmission window. The operation(s) at block 1215 may be performed using the wireless communication manager 620 described with reference to FIG. 6, the UE wireless communication manager 1050 described with reference to FIG. 10, or the uplink transmission manager 645 described with reference to FIG. 6.

In some examples, the method 1200 may include receiving an indication of the LBT procedure to be performed when contending for access to the channel of the shared radio frequency spectrum band. The indication may be received in at least one of the uplink grant (e.g., at block 1205), RRC signaling, a transmission of system information (e.g., in a SIB or a MIB), a UE-specific transmission, a cell-specific transmission, SPS information, or a combination thereof.

In some examples, the method 1200 may include receiving at least one parameter of the transmission window. In some examples, the at least one parameter may include a first indication of a start of the transmission window, a second indication of an end of the transmission window, a third indication of the duration of the transmission window, or a combination thereof. In some examples, the first indication, the second indication, or the third indication may be relative to a channel occupancy time of the network access device. In some examples, the at least one parameter of the transmission window may be received in at least one of the uplink grant (e.g., at block 1205), RRC signaling, a trans- mission of system information, a UE-specific transmission, a cell-specific transmission, SPS information, or a combination thereof.

Figure 13:
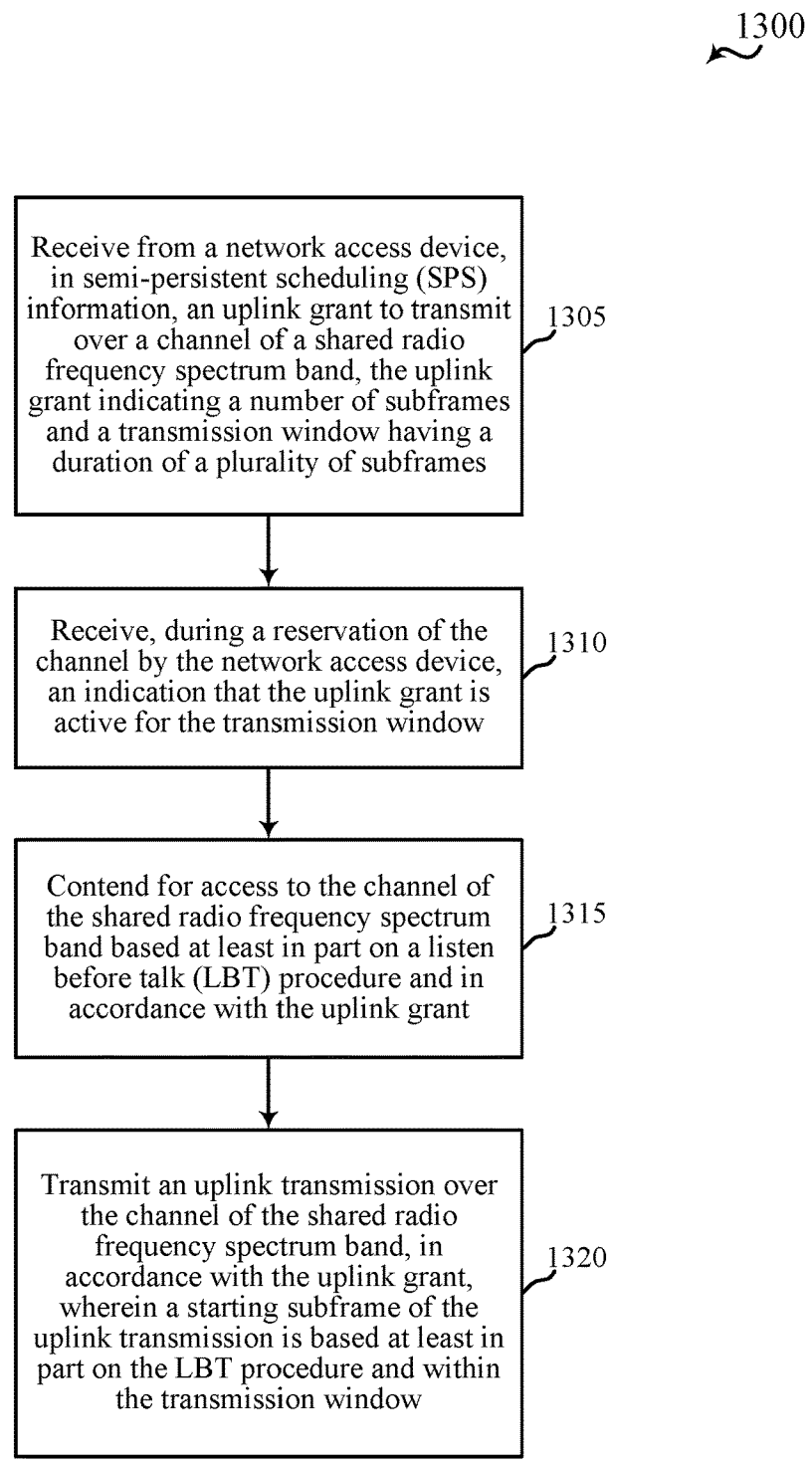
FIG. 13 is a flow chart illustrating an example of a method for wireless communication at a UE, in accordance with various aspects of the present disclosure.

FIG. 13 is a flow chart illustrating an example of a method 1300 for wireless communication at a UE, in accordance with various aspects of the present disclosure. For clarity, the method 1300 is described below with reference to aspects of one or more of the UEs 115, 215, 215-a, 215-b, or 1015 described with reference to FIG. 1, 2, or 10, or aspects of the apparatus 615 described with reference to FIG. 6. In some examples, a UE may execute one or more sets of codes to control the functional elements of the UE to perform the functions described below. Additionally or alternatively, the UE may perform one or more of the functions described below using special-purpose hardware.

At block 1305, the method 1300 may include receiving from a network access device, in SPS information, an uplink grant to transmit over a channel of a shared radio frequency spectrum band. The uplink grant may indicate a number of subframes and a transmission window having a duration of a plurality of subframes. In some examples, the transmission window may be outside a reservation of the channel by the network access device (e.g., outside all reservations of the channel by the network access device). The operation(s) at block 1305 may be performed using the wireless communication manager 620 described with reference to FIG. 6, the UE wireless communication manager 1050 described with reference to FIG. 10, or the uplink grant manager 635 described with reference to FIG. 6.

At block 1310, the method 1300 may include receiving, during a reservation of the channel by the network access device, an indication that the uplink grant is active for the transmission window. The operation(s) at block 1310 may be performed using the wireless communication manager 620 described with reference to FIG. 6, the UE wireless communication manager 1050 described with reference to FIG. 10, or the uplink grant manager 635 described with reference to FIG. 6.

At block 1315, the method 1300 may include contending for access to the channel of the shared radio frequency spectrum band based at least in part on a LBT procedure and in accordance with the uplink grant (e.g., during the transmission window). The operation(s) at block 1315 may be performed using the wireless communication manager 620 described with reference to FIG. 6, the UE wireless communication manager 1050 described with reference to FIG. 10, or the channel contention manager 640 described with reference to FIG. 6.

At block 1320, the method 1300 may include transmitting an uplink transmission over the channel of the shared radio frequency spectrum band, in accordance with the uplink grant. A starting subframe of the uplink transmission may be based at least in part on the LBT procedure and may be within the transmission window. The operation(s) at block 1320 may be performed using the wireless communication manager 620 described with reference to FIG. 6, the UE wireless communication manager 1050 described with reference to FIG. 10, or the uplink transmission manager 645 described with reference to FIG. 6.

In some examples, the method 1300 may include receiving an indication of the LBT procedure to be performed when contending for access to the channel of the shared radio frequency spectrum band. The indication may be received in at least one of the uplink grant (e.g., at block 1305), RRC signaling, a transmission of system information (e.g., in a SIB or a MIB), a UE-specific transmission, a cell-specific transmission, SPS information, or a combination thereof.

In some examples, the method 1300 may include receiving at least one parameter of the transmission window. In some examples, the at least one parameter may include a first indication of a start of the transmission window, a second indication of an end of the transmission window, a third indication of the duration of the transmission window, or a combination thereof. In some examples, the first indication, the second indication, or the third indication may be relative to a channel occupancy time of the network access device. In some examples, the at least one parameter of the transmission window may be received in at least one of the uplink grant (e.g., at block 1305), RRC signaling, a transmission of system information, a UE-specific transmission, a cell-specific transmission, SPS information, or a combination thereof.

Figure 14:
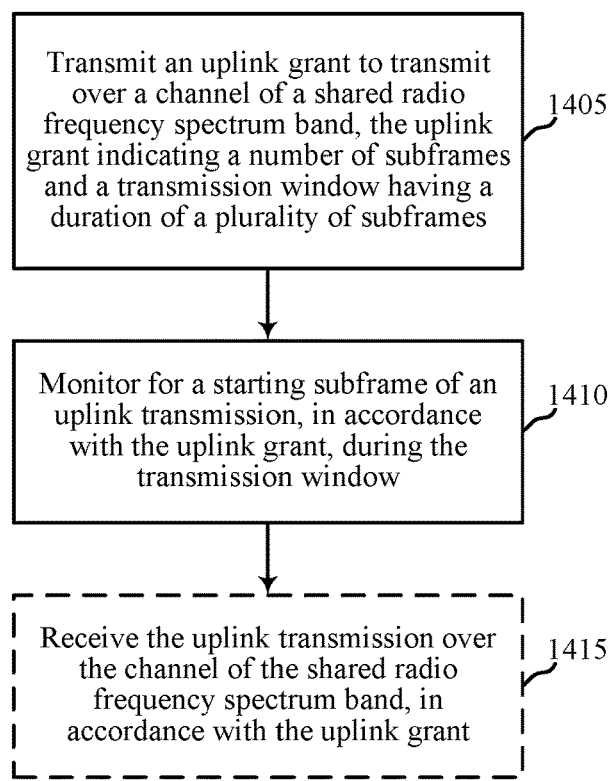
FIG. 14 is a flow chart illustrating an example of a method for wireless communication at a network access device (e.g., a base station or radio head), in accordance with various aspects of the present disclosure.

FIG. 14 is a flow chart illustrating an example of a method 1400 for wireless communication at a network access device (e.g., a base station or radio head), in accordance with various aspects of the present disclosure. For clarity, the method 1400 is described below with reference to aspects of one or more of the base stations 105, 205, or 205-a described with reference to FIG. 1 or 2, aspects of the apparatus 705 described with reference to FIG. 7, or aspects of the network access device 1105 described with reference to FIG. 11. In some examples, a network access device may execute one or more sets of codes to control the functional elements of the network access device to perform the functions described below. Additionally or alternatively, the network access device may perform one or more of the functions described below using special-purpose hardware.

At block 1405, the method 1400 may include transmitting an uplink grant to transmit over a channel of a shared radio frequency spectrum band. The uplink grant may indicate a number of subframes and a transmission window having a duration of a plurality of subframes. In some examples, the transmission window may be outside a reservation of the channel by the network access device (e.g., outside all reservations of the channel by the network access device). The operation(s) at block 1405 may be performed using the wireless communication manager 720 described with reference to FIG. 7, the network access device wireless communication manager 1160 described with reference to FIG. 11, or the uplink transmission scheduler 735 described with reference to FIG. 7.

At block 1410, the method 1400 may include monitoring for a starting subframe of an uplink transmission, in accordance with the uplink grant, during the transmission window. The operation(s) at block 1410 may be performed using the wireless communication manager 720 described with reference to FIG. 7, the network access device wireless communication manager 1160 described with reference to FIG. 11, or the uplink transmission reception manager 740 described with reference to FIG. 7.

At block 1415, the method 1400 may optionally include receiving the uplink transmission over the channel of the shared radio frequency spectrum band, in accordance with the uplink grant. The operation(s) at block 1415 may be performed using the wireless communication manager 720 described with reference to FIG. 7, the network access device wireless communication manager 1160 described with reference to FIG. 11, or the uplink transmission reception manager 740 described with reference to FIG. 7.

In some examples, the method 1400 may include transmitting an indication of a LBT procedure to be performed by a UE when contending for access to the channel of the shared radio frequency spectrum band. The LBT procedure may be performed by the UE to gain access to the shared radio frequency spectrum band in accordance with the uplink grant (e.g., during the transmission window). The indication may be transmitted in at least one of the uplink grant (e.g., at block 1405), RRC signaling, a transmission of system information (e.g., in a SIB or a MIB), a UE-specific transmission, a cell-specific transmission, SPS information, or a combination thereof.

In some examples, the method 1400 may include transmitting at least one parameter of the transmission window. In some examples, the at least one parameter may include a first indication of a start of the transmission window, a second indication of an end of the transmission window, a third indication of the duration of the transmission window, or a combination thereof. In some examples, the first indication, the second indication, or the third indication may be relative to a channel occupancy time of the network access device. In some examples, the at least one parameter of the transmission window may be transmitted in at least one of the uplink grant (e.g., at block 1405), RRC signaling, a transmission of system information, a UE-specific transmission, a cell-specific transmission, SPS information, or a combination thereof.

Figure 15:
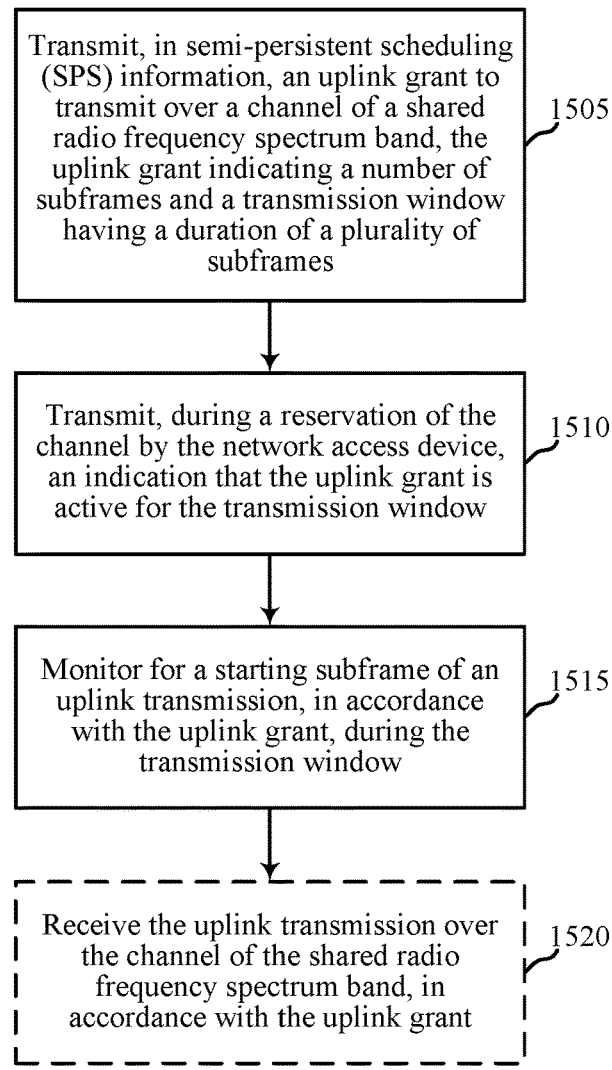
FIG. 15 is a flow chart illustrating an example of a method for wireless communication at a network access device (e.g., a base station or radio head), in accordance with various aspects of the present disclosure.

FIG. 15 is a flow chart illustrating an example of a method 1500 for wireless communication at a network access device (e.g., a base station or radio head), in accordance with various aspects of the present disclosure. For clarity, the method 1500 is described below with reference to aspects of one or more of the base stations 105, 205, or 205-a described with reference to FIG. 1 or 2, aspects of the apparatus 705 described with reference to FIG. 7, or aspects of the network access device 1105 described with reference to FIG. 11. In some examples, a network access device may execute one or more sets of codes to control the functional elements of the network access device to perform the functions described below. Additionally or alternatively, the network access device may perform one or more of the functions described below using special-purpose hardware.

At block 1505, the method 1500 may include transmitting, in SPS information, an uplink grant to transmit over a channel of a shared radio frequency spectrum band. The uplink grant may indicate a number of subframes and a transmission window having a duration of a plurality of subframes. In some examples, the transmission window may be outside a reservation of the channel by the network access device (e.g., outside all reservations of the channel by the network access device). The operation(s) at block 1505 may be performed using the wireless communication manager 720 described with reference to FIG. 7, the network access device wireless communication manager 1160 described with reference to FIG. 11, or the uplink transmission scheduler 735 described with reference to FIG. 7.

At block 1510, the method 1500 may include transmitting, during a reservation of the channel by the network access device, an indication that the uplink grant is active for the transmission window. The operation(s) at block 1510 may be performed using the wireless communication manager 720 described with reference to FIG. 7, the network access device wireless communication manager 1160 described with reference to FIG. 11, or the uplink transmission scheduler 735 described with reference to FIG. 7.

At block 1515, the method 1500 may include monitoring for a starting subframe of an uplink transmission, in accordance with the uplink grant, during the transmission window. The operation(s) at block 1515 may be performed using the wireless communication manager 720 described with reference to FIG. 7, the network access device wireless communication manager 1160 described with reference to FIG. 11, or the uplink transmission reception manager 740 described with reference to FIG. 7.

At block 1520, the method 1500 may optionally include receiving the uplink transmission over the channel of the shared radio frequency spectrum band, in accordance with the uplink grant. The operation(s) at block 1520 may be performed using the wireless communication manager 720 described with reference to FIG. 7, the network access device wireless communication manager 1160 described with reference to FIG. 11, or the uplink transmission reception manager 740 described with reference to FIG. 7.

In some examples, the method 1500 may include transmitting an indication of a LBT procedure to be performed by a UE when contending for access to the channel of the shared radio frequency spectrum band. The LBT procedure may be performed by the UE to gain access to the shared radio frequency spectrum band in accordance with the uplink grant (e.g., during the transmission window). The indication may be transmitted in at least one of the uplink grant (e.g., at block 1505), RRC signaling, a transmission of system information (e.g., in a SIB or a MIB), a UE-specific transmission, a cell-specific transmission, SPS information, or a combination thereof.

In some examples, the method 1500 may include transmitting at least one parameter of the transmission window. In some examples, the at least one parameter may include a first indication of a start of the transmission window, a second indication of an end of the transmission window, a third indication of the duration of the transmission window, or a combination thereof. In some examples, the first indication, the second indication, or the third indication may be relative to a channel occupancy time of the network access device. In some examples, the at least one parameter of the transmission window may be transmitted in at least one of the uplink grant (e.g., at block 1505), RRC signaling, a transmission of system information, a UE-specific transmission, a cell-specific transmission, SPS information, or a combination thereof.

Figure 16:
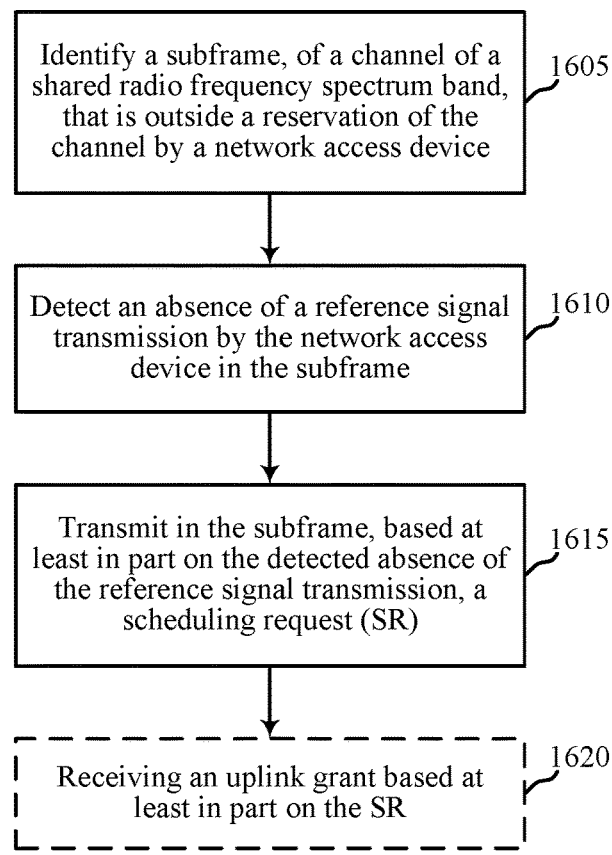
FIG. 16 is a flow chart illustrating an example of a method for wireless communication at a UE, in accordance with various aspects of the present disclosure.

FIG. 16 is a flow chart illustrating an example of a method 1600 for wireless communication at a UE, in accordance with various aspects of the present disclosure. For clarity, the method 1600 is described below with reference to aspects of one or more of the UEs 115, 215, 215-a, 215-b, or 1015 described with reference to FIG. 1, 2, or 10, or aspects of the apparatus 815 described with reference to FIG. 8. In some examples, a UE may execute one or more sets of codes to control the functional elements of the UE to perform the functions described below. Additionally or alternatively, the UE may perform one or more of the functions described below using special-purpose hardware.

At block 1605, the method 1600 may include identifying a subframe, of a channel of a shared radio frequency spectrum band, that is outside a reservation of the channel by a network access device (e.g., outside all reservations of the channel by the network access device). The operation(s) at block 1605 may be performed using the wireless communication manager 820 described with reference to FIG. 8, the UE wireless communication manager 1050 described with reference to FIG. 10, or the subframe identifier 835 described with reference to FIG. 8.

At block 1610, the method 1600 may include detecting an absence of a reference signal transmission (e.g., a CRS transmission) by the network access device in the subframe. The operation(s) at block 1610 may be performed using the wireless communication manager 820 described with reference to FIG. 8, the UE wireless communication manager 1050 described with reference to FIG. 10, or the reference signal detector 840 described with reference to FIG. 8.

At block 1615, the method 1600 may include transmitting in the subframe, based at least in part on the detected absence of the reference signal transmission, a SR. In some examples, the SR may be transmitted in a subset of symbol periods of the subframe, the subset of symbol periods starting after a first symbol period of the subframe (e.g., a center four symbol periods of the subframe). The operation(s) at block 1615 may be performed using the wireless communication manager 820 described with reference to FIG. 8, the UE wireless communication manager 1050 described with reference to FIG. 10, or the uplink transmission manager 850 described with reference to FIG. 8.

At block 1620, the method 1600 may optionally include receiving an uplink grant based at least in part on the SR. The operation(s) at block 1620 may be performed using the wireless communication manager 820 described with reference to FIG. 8, the UE wireless communication manager 1050 described with reference to FIG. 10, or the uplink transmission manager 850 described with reference to FIG. 8.

Figure 17:
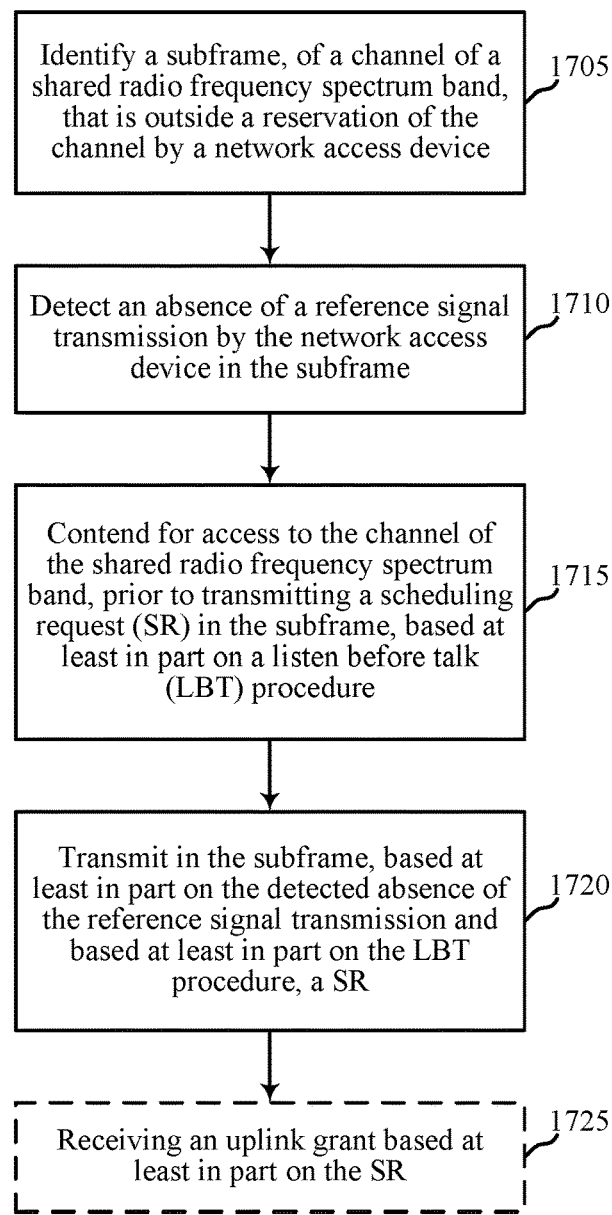
FIG. 17 is a flow chart illustrating an example of a method for wireless communication at a UE, in accordance with various aspects of the present disclosure.

FIG. 17 is a flow chart illustrating an example of a method 1700 for wireless communication at a UE, in accordance with various aspects of the present disclosure. For clarity, the method 1700 is described below with reference to aspects of one or more of the UEs 115, 215, 215-a, 215-b, or 1015 described with reference to FIG. 1, 2, or 10, or aspects of the apparatus 815 described with reference to FIG. 8. In some examples, a UE may execute one or more sets of codes to control the functional elements of the UE to perform the functions described below. Additionally or alternatively, the UE may perform one or more of the functions described below using special-purpose hardware.

At block 1705, the method 1700 may include identifying a subframe, of a channel of a shared radio frequency spectrum band, that is outside a reservation of the channel by a network access device (e.g., outside all reservations of the channel by the network access device). The operation(s) at block 1705 may be performed using the wireless communication manager 820 described with reference to FIG. 8, the UE wireless communication manager 1050 described with reference to FIG. 10, or the subframe identifier 835 described with reference to FIG. 8.

At block 1710, the method 1700 may include detecting an absence of a reference signal transmission (e.g., a CRS transmission) by the network access device in the subframe. The operation(s) at block 1710 may be performed using the wireless communication manager 820 described with reference to FIG. 8, the UE wireless communication manager 1050 described with reference to FIG. 10, or the reference signal detector 840 described with reference to FIG. 8.

At block 1715, the method 1700 may include contending for access to the channel of the shared radio frequency spectrum band, prior to transmitting a SR in the subframe, based at least in part on a LBT procedure. The operation(s) at block 1715 may be performed using the wireless communication manager 820 described with reference to FIG. 8, the UE wireless communication manager 1050 described with reference to FIG. 10, or the channel contention manager 845 described with reference to FIG. 8.

At block 1720, the method 1700 may include transmitting in the subframe, based at least in part on the detected absence of the reference signal transmission and based at least in part on the LBT procedure, a SR. In some examples, the SR may be transmitted in a subset of symbol periods of the subframe, the subset of symbol periods starting after a first symbol period of the subframe (e.g., a center four symbol periods of the subframe). The operation(s) at block 1720 may be performed using the wireless communication manager 820 described with reference to FIG. 8, the UE wireless communication manager 1050 described with reference to FIG. 10, or the uplink transmission manager 850 described with reference to FIG. 8.

At block 1725, the method 1700 may optionally include receiving an uplink grant based at least in part on the SR. The operation(s) at block 1725 may be performed using the wireless communication manager 820 described with reference to FIG. 8, the UE wireless communication manager 1050 described with reference to FIG. 10, or the uplink transmission manager 850 described with reference to FIG. 8.

Figure 18:
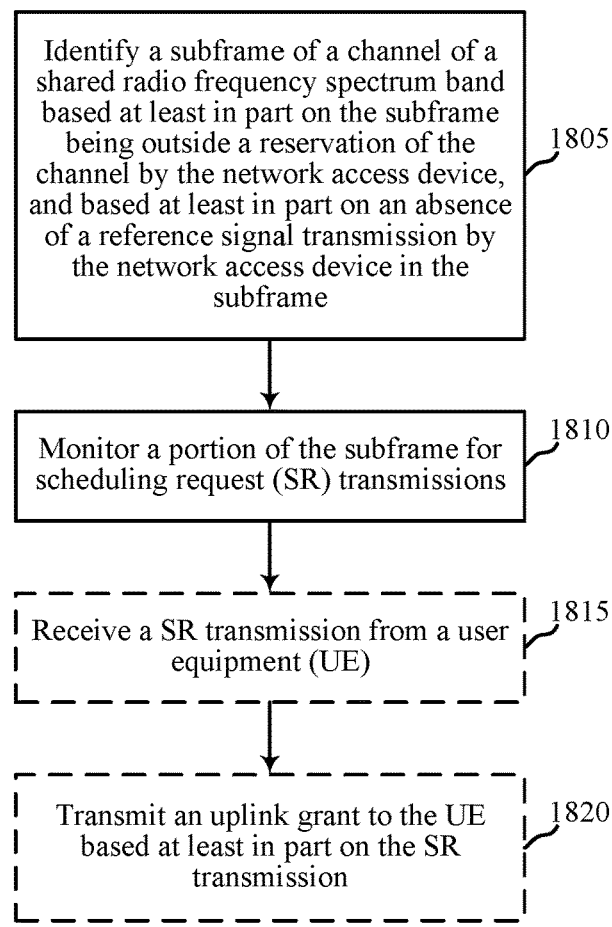
FIG. 18 is a flow chart illustrating an example of a method for wireless communication at a network access device (e.g., a base station or radio head), in accordance with various aspects of the present disclosure.

FIG. 18 is a flow chart illustrating an example of a method 1800 for wireless communication at a network access device (e.g., a base station or radio head), in accordance with various aspects of the present disclosure. For clarity, the method 1800 is described below with reference to aspects of one or more of the base stations 105, 205, or 205-*a* described with reference to FIG. 1 or 2, aspects of the apparatus 905 described with reference to FIG. 9, or aspects of the network access device 1105 described with reference to FIG. 11. In some examples, a network access device may execute one or more sets of codes to control the functional elements of the network access device to perform the functions described below. Additionally or alternatively, the network access device may perform one or more of the functions described below using special-purpose hardware.

At block 1805, the method 1800 may include identifying a subframe of a channel of a shared radio frequency spectrum band based at least in part on the subframe being outside a reservation of the channel by the network access device, and based at least in part on an absence of a reference signal transmission (e.g., a CRS transmission) by the network access device in the subframe. The operation(s) at block 1805 may be performed using the wireless communication manager 920 described with reference to FIG. 9, the network access device wireless communication manager 1160 described with reference to FIG. 11, or the subframe identifier 935 described with reference to FIG. 9.

At block 1810, the method 1800 may include monitoring a portion of the subframe for SR transmissions. In some examples, the monitored portion of the subframe may include a subset of symbol periods of the subframe, the subset of symbol periods starting after a first symbol period of the subframe (e.g., a center four symbol periods of the subframe). The operation(s) at block 1810 may be performed using the wireless communication manager 920 described with reference to FIG. 9, the network access device wireless communication manager 1160 described with reference to FIG. 11, or the uplink transmission scheduler 940 described with reference to FIG. 9.

At block 1815, the method 1800 may optionally include receiving a SR transmission from a UE. The operation(s) at block 1815 may be performed using the wireless communication manager 920 described with reference to FIG. 9, the network access device wireless communication manager 1160 described with reference to FIG. 11, or the uplink transmission scheduler 940 described with reference to FIG. 9.

At block 1820, the method 1800 may optionally include transmitting an uplink grant to the UE based at least in part on the SR transmission. The operation(s) at block 1820 may be performed using the wireless communication manager 920 described with reference to FIG. 9, the network access device wireless communication manager 1160 described with reference to FIG. 11, or the uplink transmission scheduler 940 described with reference to FIG. 9.

Figure 19:
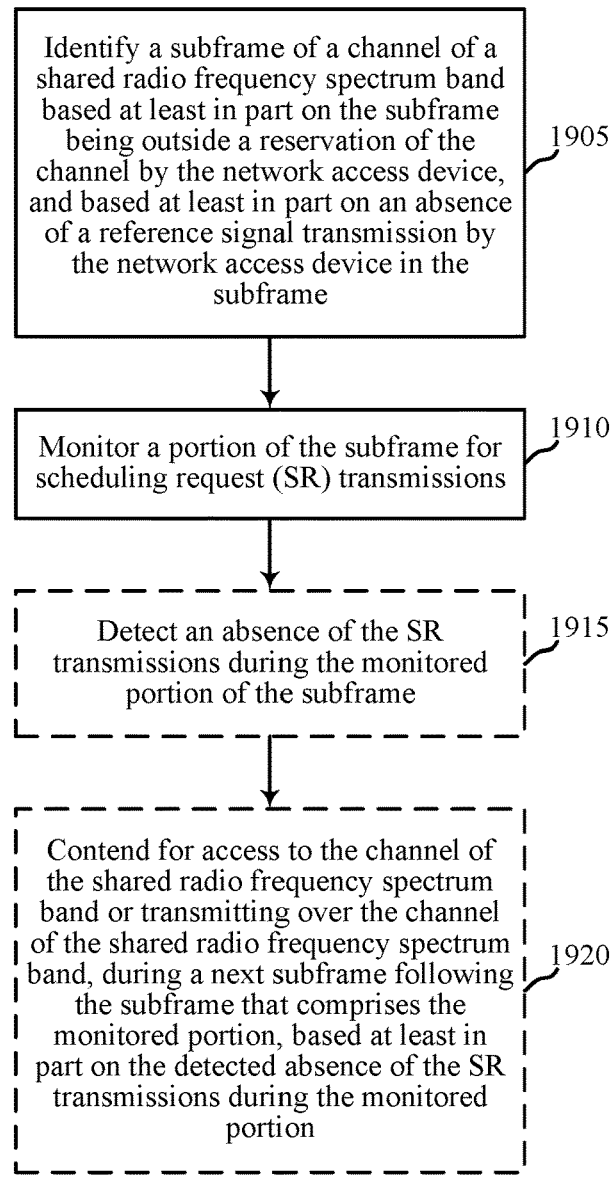
FIG. 19 is a flow chart illustrating an example of a method for wireless communication at a network access device (e.g., a base station or radio head), in accordance with various aspects of the present disclosure.

FIG. 19 is a flow chart illustrating an example of a method 1900 for wireless communication at a network access device (e.g., a base station or radio head), in accordance with various aspects of the present disclosure. For clarity, the method 1900 is described below with reference to aspects of one or more of the base stations 105, 205, or 205-*a* described with reference to FIG. 1 or 2, aspects of the apparatus 905 described with reference to FIG. 9, or aspects of the network access device 1105 described with reference to FIG. 11. In some examples, a network access device may execute one or more sets of codes to control the functional elements of the network access device to perform the functions described below. Additionally or alternatively, the network access device may perform one or more of the functions described below using special-purpose hardware.

At block 1905, the method 1900 may include identifying a subframe of a channel of a shared radio frequency spectrum band based at least in part on the subframe being outside a reservation of the channel by the network access device, and based at least in part on an absence of a reference signal transmission (e.g., a CRS transmission) by the network access device in the subframe. The operation(s) at block 1905 may be performed using the wireless communication manager 920 described with reference to FIG. 9, the network access device wireless communication manager 1160 described with reference to FIG. 11, or the subframe identifier 935 described with reference to FIG. 9.

At block 1910, the method 1900 may include monitoring a portion of the subframe for SR transmissions. In some examples, the monitored portion of the subframe may include a subset of symbol periods of the subframe, the subset of symbol periods starting after a first symbol period of the subframe (e.g., a center four symbol periods of the subframe). The operation(s) at block 1910 may be performed using the wireless communication manager 920 described with reference to FIG. 9, the network access device wireless communication manager 1160 described with reference to FIG. 11, or the uplink transmission scheduler 940 described with reference to FIG. 9.

At block 1915, the method 1900 may optionally include detecting an absence of the SR transmissions during the monitored portion of the subframe. The operation(s) at block 1915 may be performed using the wireless communication manager 920 described with reference to FIG. 9, the network access device wireless communication manager 1160 described with reference to FIG. 11, or the uplink transmission scheduler 940 described with reference to FIG. 9.

At block 1920, the method 1900 may optionally include contending for access to the channel of the shared radio frequency spectrum band or transmitting over the channel of the shared radio frequency spectrum band, during a next subframe following the subframe that includes the monitored portion, based at least in part on the detected absence of the SR transmissions during the monitored portion. The operation(s) at block 1920 may be performed using the wireless communication manager 920 described with reference to FIG. 9, the network access device wireless communication manager 1160 described with reference to FIG. 11, or the downlink transmission manager 945 described with reference to FIG. 9.

The methods 1200, 1300, 1400, 1500, 1600, 1700, 1800, and 1900 described with reference to FIGS. 12, 13, 14, 15,

16, 17, 18, and 19 illustrate just some techniques, and some implementations of techniques, described in the present disclosure. In some examples, the operations of the methods may be rearranged or otherwise modified such that other implementations are possible. In some examples, aspects of the methods 1200, 1300, 1600, or 1700 may be combined. In some examples, aspects of the methods 1400, 1500, 1800, or 1900 may be combined.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media may include RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
    identifying a subframe, of a channel of a shared radio frequency spectrum band, that is outside a reservation of the channel by a network access device;
    detecting an absence of a reference signal transmission by the network access device in the subframe;
    transmitting in the subframe, based at least in part on the detected absence of the reference signal transmission, a scheduling request (SR) prior to receiving an uplink grant; and
    receiving the uplink grant based at least in part on the SR.

2. The method of claim 1, wherein the reference signal transmission comprises a cell-specific reference signal (CRS) transmission.

3. The method of claim 1, wherein the identifying and the detecting occur in a first symbol period of the subframe.

4. The method of claim 1, wherein the SR is transmitted in a subset of symbol periods of the subframe, the subset of symbol periods starting after a first symbol period of the subframe.

5. The method of claim 1, further comprising:
    contending for access to the channel of the shared radio frequency spectrum band, prior to transmitting the SR in the subframe, based at least in part on a listen before talk (LBT) procedure;
    wherein the SR is transmitted based at least in part on the LBT procedure.

6. The method of claim 1, further comprising: transmitting an uplink transmission over the channel of the shared radio frequency spectrum band in accordance with the uplink grant.

7. The method of claim 1, wherein transmitting the SR is part of a random access channel transmission or a buffer status report (BSR) transmission.

8. An apparatus for wireless communication at a user equipment (UE), comprising:
    a processor; and
    memory in electronic communication with the processor; and
    instructions stored in the memory, wherein the instructions are executable by the processor to:
    identify a subframe, of a channel of a shared radio frequency spectrum band, that is outside a reservation of the channel by a network access device;
    detect an absence of a reference signal transmission by the network access device in the subframe;
    transmit in the subframe, based at least in part on the detected absence of the reference signal transmission, a scheduling request (SR) prior to receiving an uplink grant; and
    receive the uplink grant based at least in part on the SR.

9. The apparatus of claim 8, wherein the reference signal transmission comprises a cell-specific reference signal (CRS) transmission.

10. The apparatus of claim 8, wherein the identification and the detection occur in a first symbol period of the subframe.

11. The apparatus of claim 8, wherein the SR is transmitted in a subset of symbol periods of the subframe, the subset of symbol periods starting after a first symbol period of the subframe.

12. The apparatus of claim 8, wherein the instructions are executable by the processor to:
    contend for access to the channel of the shared radio frequency spectrum band, prior to transmitting the SR in the subframe, based at least in part on a listen before talk (LBT) procedure;
    wherein the SR is transmitted based at least in part on the LBT procedure.

13. The apparatus of claim 8, wherein the instructions are executable by the processor to: transmit an uplink transmission over the channel of the shared radio frequency spectrum band in accordance with the uplink grant.

14. The apparatus of claim 8, wherein the transmitted SR is part of a random access channel transmission or a buffer status report (BSR) transmission.

15. A method for wireless communication at a network access device, comprising:
    identifying a subframe of a channel of a shared radio frequency spectrum band based at least in part on the subframe being outside a reservation of the channel by the network access device, and based at least in part on an absence of a reference signal transmission by the network access device in the subframe;
    monitoring a portion of the subframe for scheduling request (SR) transmissions;
    receiving an SR transmission from a user equipment (UE) prior to transmitting an uplink grant; and
    transmitting the uplink grant to the UE based at least in part on the SR transmission.

16. The method of claim 15, wherein the reference signal transmission comprises a cell-specific reference signal (CRS) transmission.

17. The method of claim 15, wherein the monitored portion of the subframe comprises a subset of symbol periods of the subframe, the subset of symbol periods starting after a first symbol period of the subframe.

18. The method of claim 15, further comprising:
    detecting an absence of the SR transmissions during the monitored portion of the subframe; and
    contending for access to the channel of the shared radio frequency spectrum band based at least in part on the detected absence of the SR transmissions during the monitored portion.

19. The method of claim 15, further comprising:
    detecting an absence of the SR transmissions during the monitored portion of the subframe; and
    transmitting over the channel of the shared radio frequency spectrum band, during a next subframe following the subframe that comprises the monitored portion based at least in part on the detected absence of the SR transmissions during the monitored portion.

20. An apparatus for wireless communication, comprising:
    a processor;
    memory in electronic communication with the processor; and
    instructions stored in the memory and executable by the processor to cause the apparatus to:
    identify a subframe of a channel of a shared radio frequency spectrum band based at least in part on the subframe being outside a reservation of the channel by the network access device, and based at least in part on an absence of a reference signal transmission by the network access device in the subframe;

monitor a portion of the subframe for scheduling request (SR) transmissions;

receive an SR transmission from a user equipment (UE) prior to transmitting an uplink grant; and transmit the uplink grant to the UE based at least in part on the SR transmission.

21. The apparatus of claim 20, wherein the reference signal transmission comprises a cell-specific reference signal (CRS) transmission.

22. The apparatus of claim 20, wherein the monitored portion of the subframe comprises a subset of symbol periods of the subframe, the subset of symbol periods starting after a first symbol period of the subframe.

23. The apparatus of claim 20, wherein the instructions are further executable by the processor to cause the apparatus to:

detect an absence of the SR transmissions during the monitored portion of the subframe; and contend for access to the channel of the shared radio frequency spectrum band based at least in part on the detected absence of the SR transmissions during the monitored portion.

24. The apparatus of claim 20, wherein the instructions are further executable by the processor to cause the apparatus to:

detect an absence of the SR transmissions during the monitored portion of the subframe; and transmit over the channel of the shared radio frequency spectrum band, during a next subframe following the subframe that comprises the monitored portion based at least in part on the detected absence of the SR transmissions during the monitored portion.

* * * * *